US007652712B2

(12) United States Patent
Watanabe et al.

(10) Patent No.: US 7,652,712 B2
(45) Date of Patent: Jan. 26, 2010

(54) LENS SHIFTING STRUCTURE FOR IMAGE CAPTURING APPARATUS

(75) Inventors: Norihiro Watanabe, Tokyo (JP); Noriyuki Komori, Tokyo (JP); Atsushi Michimori, Tokyo (JP); Hideki Kunishio, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 441 days.

(21) Appl. No.: 11/666,158

(22) PCT Filed: Aug. 30, 2005

(86) PCT No.: PCT/JP2005/015753
§ 371 (c)(1),
(2), (4) Date: Apr. 24, 2007

(87) PCT Pub. No.: WO2006/046350
PCT Pub. Date: May 4, 2006

(65) Prior Publication Data
US 2008/0068489 A1 Mar. 20, 2008

(30) Foreign Application Priority Data
Oct. 25, 2004 (JP) ............................. 2004-309014

(51) Int. Cl.
*H04N 5/225* (2006.01)
(52) U.S. Cl. ...................... 348/340; 348/208.11; 396/55
(58) Field of Classification Search ................ 348/335, 348/340, 373, 374, 375, 345, 240.99, 240.3, 348/208.7, 208.99, 208.11; 396/75, 52, 55, 396/349, 348, 350, 343, 270, 340, 341; 359/824, 359/823, 814
See application file for complete search history.

(56) References Cited

U.S. PATENT DOCUMENTS

| 6,449,432 | B1 * | 9/2002 | Uenaka ........................ 396/52 |
| 7,123,290 | B2 * | 10/2006 | Ohishi ...................... 348/208.4 |
| 2004/0017485 | A1 | 1/2004 | Ohishi |

FOREIGN PATENT DOCUMENTS

| JP | 7-318864 A | 12/1995 |
| JP | 8-203102 A | 8/1996 |
| JP | 9-22537 A | 1/1997 |

(Continued)

*Primary Examiner*—Lin Ye
*Assistant Examiner*—Nelson D Hernández Hernández
(74) *Attorney, Agent, or Firm*—Birch, Stewart, Kolasch & Birch, LLP

(57) ABSTRACT

The present invention belongs to the field of an image capturing apparatus such as a camera for mobile phone and the like, and has an object to obtain a three axis lens shifting mechanism capable of achieving size reduction and cost reduction with simple structure and an image capturing apparatus equipped with such three axis lens shifting mechanism. A single magnetic circuit exerts an influence of a magnetic field produced by magnets (20) upon active sides of a focusing coil (14) and active sides of coils (10a), (10b). Therefore, movable parts (11+17) can be driven in the direction of optical axis (Z) only by controlling the direction of energizing the focusing coil (14), and further, a first movable part (11) can be driven in a first direction (X) or second direction (direction of rotation) (Y) only by combination of the directions of energizing the coils (10a), (10b). This allows the sharing of the magnetic circuit and an electromagnetic actuator.

15 Claims, 15 Drawing Sheets

FOREIGN PATENT DOCUMENTS

| | | |
|---|---|---|
| JP | 2000-194026 A | 7/2000 |
| JP | 2001-75137 A | 3/2001 |
| JP | 2001-194699 A | 7/2001 |
| JP | 2002-56555 A | 2/2002 |
| JP | 2003-186073 A | 7/2003 |
| JP | 2003-241247 A | 8/2003 |

* cited by examiner

| DIRECTION OF CURRENT IN TWO-AXIS COIL (UPPER SIDE) 10b | ⊗ |
|---|---|
| ELECTROMAGNETIC FORCE | ← |

| DIRECTION OF CURRENT IN TWO-AXIS COIL (LOWER SIDE) 10a | ⊗ |
|---|---|
| ELECTROMAGNETIC FORCE | ⇨ |

LENS SHIFTING STRUCTURE FOR IMAGE CAPTURING APPARATUS

TECHNICAL FIELD

The present invention belongs to the field of an image capturing apparatus such as a still camera, a video camera, a camera for mobile phone and the like, and more specifically, it relates to the structure of a three axis lens shifting mechanism (shake correcting device) for correcting a blurred image caused by user's handshake or the like and an image capturing apparatus equipped with such three axis lens shifting mechanism.

BACKGROUND ART

A conventional objective lens drive unit adjusts the position of the objective lens in the direction of focusing by sliding a lens holder (objective lens) inserted in a support shaft in the direction of the optical axis and along the support shaft by means of an electromagnetic force obtained by the interaction between current which energizes a focusing coil and a magnetic field, and also adjusts the position of the objective lens in the direction of tracking by rotating the lens holder about the support shaft by means of an electromagnetic force obtained by the interaction between current which energizes a tracking coil and a magnetic field.

Patent Document 1: Japanese Patent Application Laid-Open No. 8-203102 (page 7, FIG. 3, FIG. 5)

Patent Document 2: U.S. Pat. No. 33,548

The above-described conventional objective lens drive unit is unsuitable for size reduction since a magnetic circuit for obtaining the electromagnetic force in the direction of the optical axis and a magnetic circuit for obtaining the electromagnetic force in the direction of rotation about the support shaft are provided separately.

Further, another pair of magnetic circuits are additionally required in the case of forming a three axis lens shifting mechanism for implementing an image blur correcting function and an automatic focusing function of an image capturing apparatus applying the above-described objective lens drive unit, which is further unsuitable for size reduction.

Furthermore, in the above-described conventional objective lens drive unit, the lens holder is slid or rotated about the support shaft, which causes a nonnegligible influence by friction. Therefore, a structure is presented in which a balancing weight is provided in a position substantially symmetric to the objective lens with respect to the support shaft, to thereby make the center of gravity of the lens holder agree with the position of the support shaft, so that the influence by friction is minimized. With such structure, however, the weight of a movable part is increased by the balancing weight, thus requiring a greater amount of driving force, which is not suitable for reducing consumption power.

DISCLOSURE OF INVENTION

The present invention has been made to solve the above-described various problems, and has an object to obtain a three axis lens shifting mechanism capable of achieving size reduction, cost reduction and low power consumption with simple structure and an image capturing apparatus equipped with such three axis lens shifting mechanism.

The image capturing apparatus according to the subject of the present invention includes an imaging device including a light receiving surface and converting an optical image formed on the light receiving surface into an electric signal, an image forming lens guiding an image of a subject to the light receiving surface, a first movable base holding the image forming lens, a fixed part holding the imaging device and supporting the first movable base to be movable translationally in a first direction within a surface perpendicular to an optical axis of the image forming lens and to be rotatable about an axis in parallel to the optical axis and rotatable in a second direction substantially perpendicular to the first direction included in the perpendicular surface, a pair of magnets provided on the fixed part in a position that does not prevent the image of the subject from being guided to the light receiving surface, a pair of coils provided on the first movable base symmetrically relative to a surface defined by the direction of the optical axis of the image forming lens and the first direction, the pair of coils each including an active side substantially in parallel to the direction of the optical axis, and a power supply feeding current to each of the pair of coils. The active side of each of the pair of coils is diametrically opposed to a corresponding one of the pair of magnets opposed to the coil. A driving force in the first direction or the second direction is obtained by combination of directions of feeding current to the pair of coils.

According to the subject of the present invention, a combination of directions of feeding current to the pair of coils can be changed into the translational force for moving the first movable base in the first direction and a moment for rotating the second movable base about the axis, which can achieve driving in two directions with one magnetic circuit.

These and other objects, features, aspects and advantages of the present invention will become more apparent from the following detailed description of the present invention when taken in conjunction with the accompanying drawings.

BEST MODE FOR CARRYING OUT THE INVENTION

Figure 1:
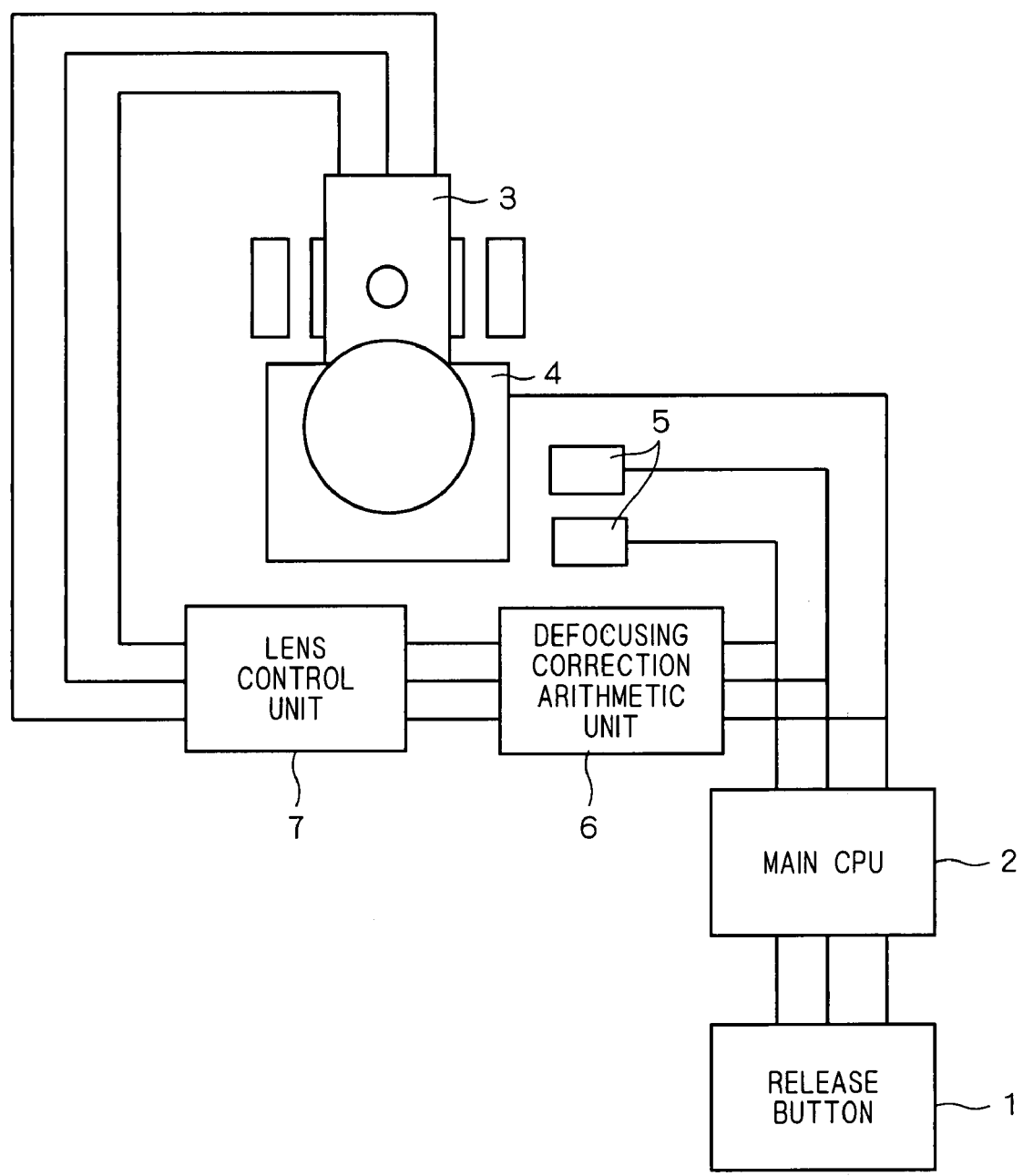
FIG. 1 is a block diagram of an image capturing apparatus according to the present invention, showing the flow starting from half-press of a release button until a focus adjusting process and a shake correcting process are carried out.

FIG. 1 is a block diagram in an image capturing apparatus according to the present invention showing the flow starting from half-press of a release button until a focus adjusting process and/or a shake correcting process are carried out. This image capturing apparatus includes a release button 1, a main CPU 2, a three axis lens shifting mechanism 3, a defocusing detecting unit 4, a shake detecting unit 5, a defocusing correction arithmetic unit 6 and a lens control unit 7.

In the image capturing apparatus of the above structure, when the release button 1 is half pressed, the defocusing detecting unit 4 detects defocusing of a subject under an instruction from the main CPU 2, and outputs an output signal in accordance with the amount of defocusing to the defocusing correction arithmetic unit 6. The defocusing correction arithmetic unit 6 performs arithmetic of a driving signal (driving current) for an image forming lens (also simply called a lens or a lens group: not shown in FIG. 1) in the direction Z (a third direction: corresponding to the direction parallel to the optical axis of the image forming lens) on the basis of the output signal of the defocusing detecting unit 4, and then feeds the driving signal to a focusing coil (not shown in FIG. 1; corresponding to a focusing coil 14 in FIG. 2) of the three axis lens shifting mechanism 3, to thereby shift the lens in the direction Z.

On the other hand, the shake detecting unit (shake detecting unit) 5 detects angular velocities of a blurred image occurred by user's handshake or the like about the X axis and Y axis, respectively, and outputs an output signal in accordance with the amount of blur to the defocusing correction arithmetic unit 6. The defocusing correction arithmetic unit 6 performs arithmetic of a driving signal (driving current) for the aforementioned lens in the direction X (also called a first direction X) or direction Y (also called a second direction Y) on the basis of the output signal of the shake detecting unit 5, and then feeds the driving signal to coils (not shown in FIG. 1; corresponding to coils 10a, 10b in FIG. 2) of the three axis lens shifting mechanism 3, to thereby shift the aforementioned lens in the direction X or direction Y.

Hereinafter, respective embodiments of the present invention will be described centering on the structure and operation of the three-axis lens shifting mechanism 3 forming the heart of the present invention.

First Embodiment

Figure 2:
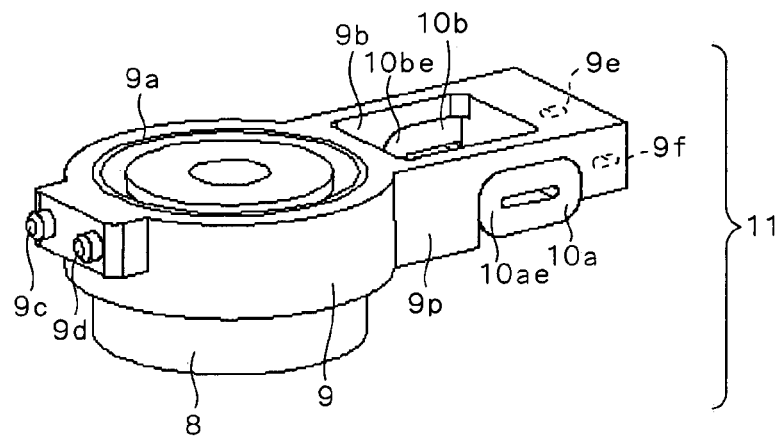
FIG. 2 is a disassembled perspective view showing the structure of a main part of an image capturing apparatus according to a first embodiment of the present invention.
Figure 2:
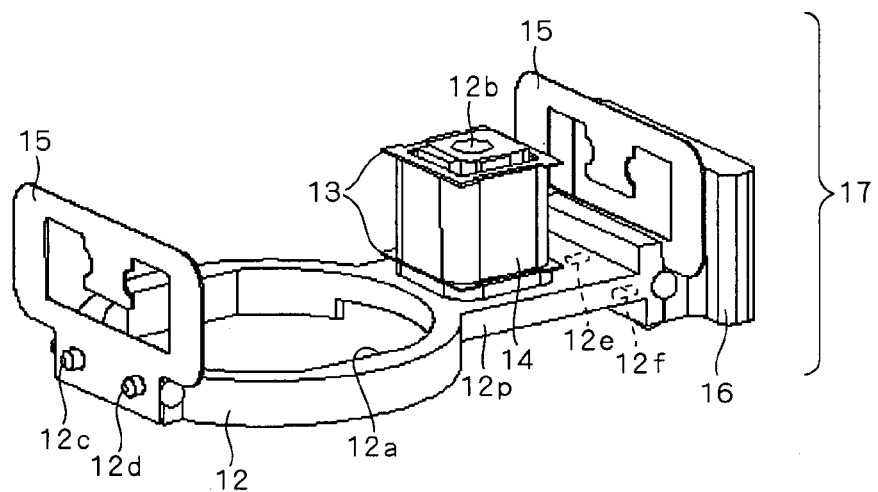
Figure 2:
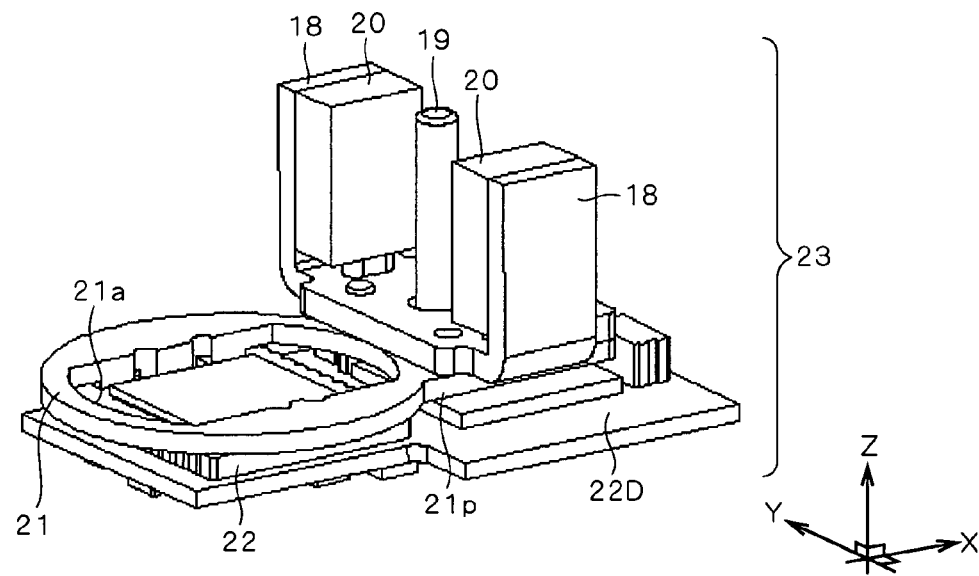

FIG. 2 is a disassembled perspective view showing the structure of a main part of an image capturing apparatus according to the present embodiment, namely, the structure of a mechanism mainly composed of the three axis lens shifting mechanism 3.

In FIG. 2, a lens group 8 forming an objective lens (image forming lens) is formed of one or a plurality of lenses (not shown), and the one or plurality of lenses are held by a lens holder having a screw-threaded cylindrical contour with a predetermined space kept therebetween. A first movable base 9, as shown in FIG. 2, is made up of a substantially cylindrical portion for holding the objective lens and a projecting portion 9p holding a pair of coils to be described later and projecting from the cylindrical portion in the first direction X, and the lens group 8 is threadingly held in a screw hole 9a. Further, an interference avoiding hole 9b having a rectangular shape in transverse cross section is formed to extend through the aforementioned projecting portion 9p in the vicinity of the screw hole 9a such that the central position of the screw hole 9a in transverse cross section and the central position of the interference avoiding hole 9b in transverse cross section are aligned in the direction of the axis X. Further, two U-shaped grooves are formed in the projecting portion 9p symmetrically about the axis X with respect to the center of the interference avoiding hole 9b, and a pair of coils (first coils) 10a and 10b are bonded and fixed to these U-shaped grooves, respectively, each fitting within a corresponding one of the U-shaped grooves. Here, a section made up of these members, namely, a component made up of the lens group 8, first movable base 9 and pair of coils 10a and 10b assembled as shown in FIG. 2 will be called a "first movable part 11".

Further, as shown in FIG. 2, a second movable base 12 is made up of a first opening 12a (almost circular in transverse cross section) through which an optical image of a subject is to be passed and a projection 12p having a rectangular shape in transverse cross section formed unitarily with the first opening 12a and projecting in the first direction X. A through hole (not shown) is formed almost at the center of the projection 12p of the second movable base 12 into which a support shaft 19 to be described later is to be inserted, and the central position of this through hole in transverse cross section and the central position of the first opening 12a in transverse cross section are aligned in the direction of the axis X. Further, a focusing coil (second coil) 14 is provided and fixed almost at the center of the upper surface of the projection of the second movable base 12, and the central axis of a cylindrical hole 12b of the focusing coil 14 and the central axis of the aforementioned through hole are positioned in a coaxial relation. Therefore, the support shaft 19 may also be inserted through the cylindrical hole 12b of the focusing coil 14. And, two magnetic pieces 13 are provided above almost the center of the upper surface of the aforementioned projection so as to sandwich the focusing coil 14 in the direction Z. Here, a section made up of these members, namely, a component made up of the second movable base 12, two magnetic pieces 13, focusing coil 14, two plate springs 15 which will be described later and one balancing weight 16 as assembled will be called a "second movable part 17". The focusing coil 14 is positioned in a space within the interference avoiding hole 9*b* of the first movable part 11 after the both movable parts 11 and 17 are assembled by way of the two plate springs 15.

The plate springs 15 each have its one end (lower part) bonded and fixed to the second movable base 12 at bosses 12*c*, 12*d*, 12*e* and 12*f* provided two each on the both sides of the second movable base 12 in the direction of the X axis, and its other end (upper part) bonded and fixed to the first movable base 9 at bosses 9*c*, 9*d*, 9*e* and 9*f* provided two each on the both sides of the first movable base 9 in the direction of the X axis. Employing such connection structure by these plate springs 15, the first movable part 11 is supported to be movable translationally substantially in the direction of the axis X with respect to the second movable part 17.

The balancing weight 16 is a member for adjusting the balance of weight such that the center of gravity of the movable parts (first movable part 11+second movable part 17) (corresponding to second center of gravity G2 shown in FIGS. 3 and 4) is positioned at the center of the central axis of the cylindrical hole 12*b* serving as the center of driving, and is bonded and fixed to one end of the second movable base 12 in the direction of the axis X. In other words, the balancing weight 16 is provided on one end of the second movable base 12 in the direction of the axis X in a position substantially symmetrical to the position in which the image forming lens 8 is disposed with respect to a support shaft 19.

A yoke 18 is made of a magnetic material, and, as shown in FIG. 2, is bent symmetrically into U-shape relative to the XZ plane defined by the axis X and axis Z. A through hole (FIG. 2) provided at the center of the yoke 18 holds the lower end of the support shaft 19 coated with fluororesin having relatively low coefficient of friction. Further, magnets 20 magnetized at two poles in the direction of the axis Y are bonded and fixed to the both inner sides of the yoke 18 bent into U-shape such that the directions of magnetization are symmetrical with respect to the axis X. In such a manner, the yoke 18, support shaft 19 and magnets 20 constitute a single magnetic circuit. Then, also shown in FIGS. 4 and 6 which will be mentioned later, when the three axis lens shifting mechanism is assembled by inserting the support shaft 19 into the cylindrical hole 12*b* of the movable parts (first movable part 11+second movable part 17), each of active sides 10*ae* and 10*be* of the pair of coils 10*a* and 10*b* becomes diametrically opposed to a corresponding one of the pair of magnets 20 opposed to each coil. At this time, the yoke 18, support shaft 19 and magnets 20 constitute a "magnetic circuit portion" forming a magnetic path to apply magnetic flux to the respective active sides 10*ae* and 10*be* of the pair of coils 10*a* and 10*b*.

A fixed base 21 includes a second opening 21*a* through which an optical image of a subject is to be passed and a projecting plate portion 21*p* projecting from a substantially cylindrical portion forming the second opening 21*a* along the axis X, and the bottom of the yoke 18 (a portion interposed between the opposed U-shaped sides) is secured to the upper surface of the projecting plate portion 21*p* of the fixed base 21 with respect to two securing holes (not shown). The one end of the support shaft 19 is secured almost at the center of the upper surface of the projecting plate portion 21*p*. The rear side of the second opening 21*a* of the fixed base 21 is provided with projections for positioning and fixing an imaging device (e.g., CCD) 22, through which the imaging device 22 can be accurately positioned on and fixed to the fixed base 21. Here, the imaging device 22 is a device having a light receiving surface and converting an optical image formed on that light receiving surface into an electric signal, and is mounted on one surface of an imaging device driving substrate 22D with a driving circuit for driving the imaging device 22 formed on its surface. Here, a section made up of these members, namely, the yoke 18, support shaft 19, pair of magnets 20, fixed base 21, imaging device 22 and driving substrate 22D as assembled will be called a "fixed part 23".

Figure 3:
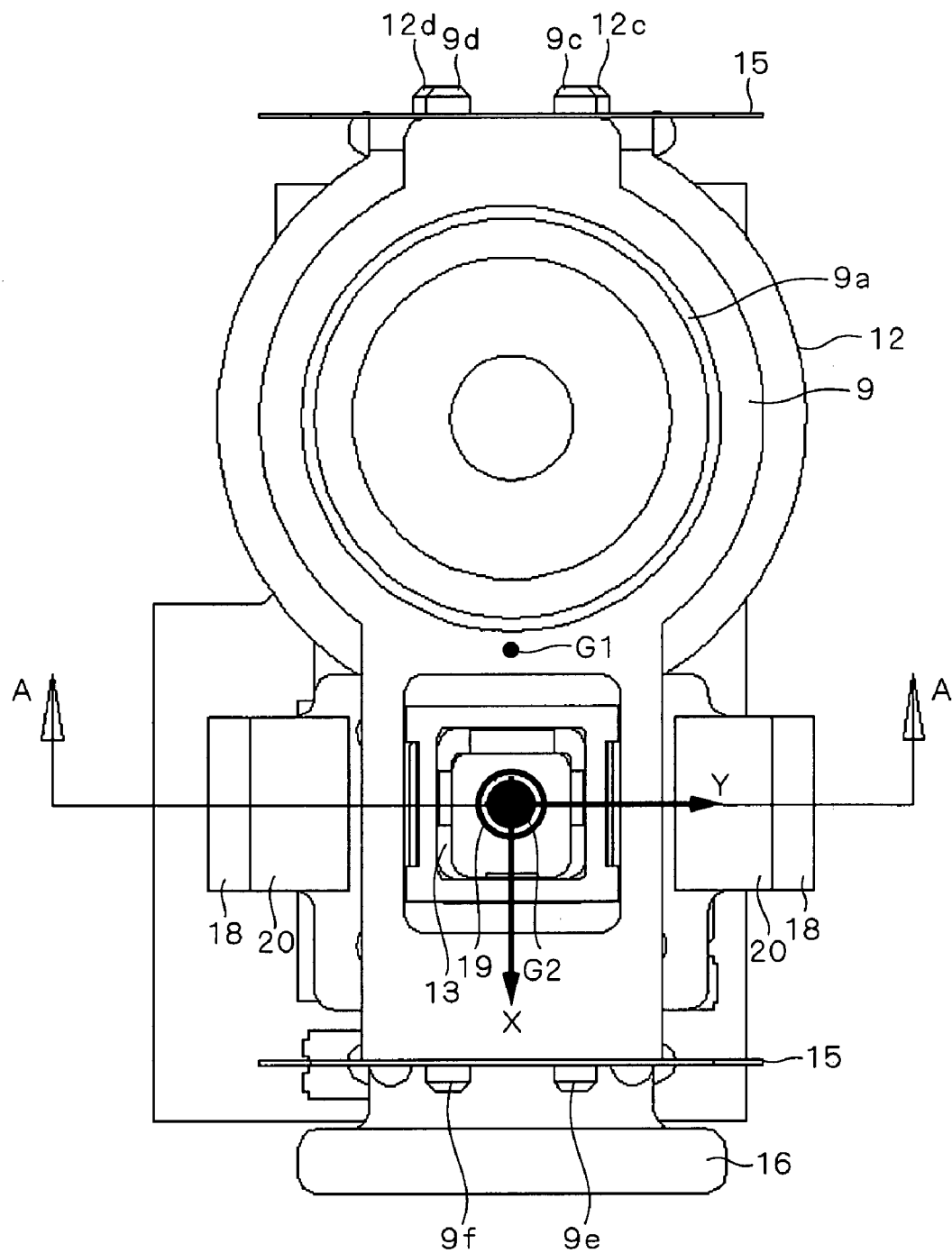
FIG. 3 is a top view of the image capturing apparatus according to the first embodiment of the present invention.
Figure 4:
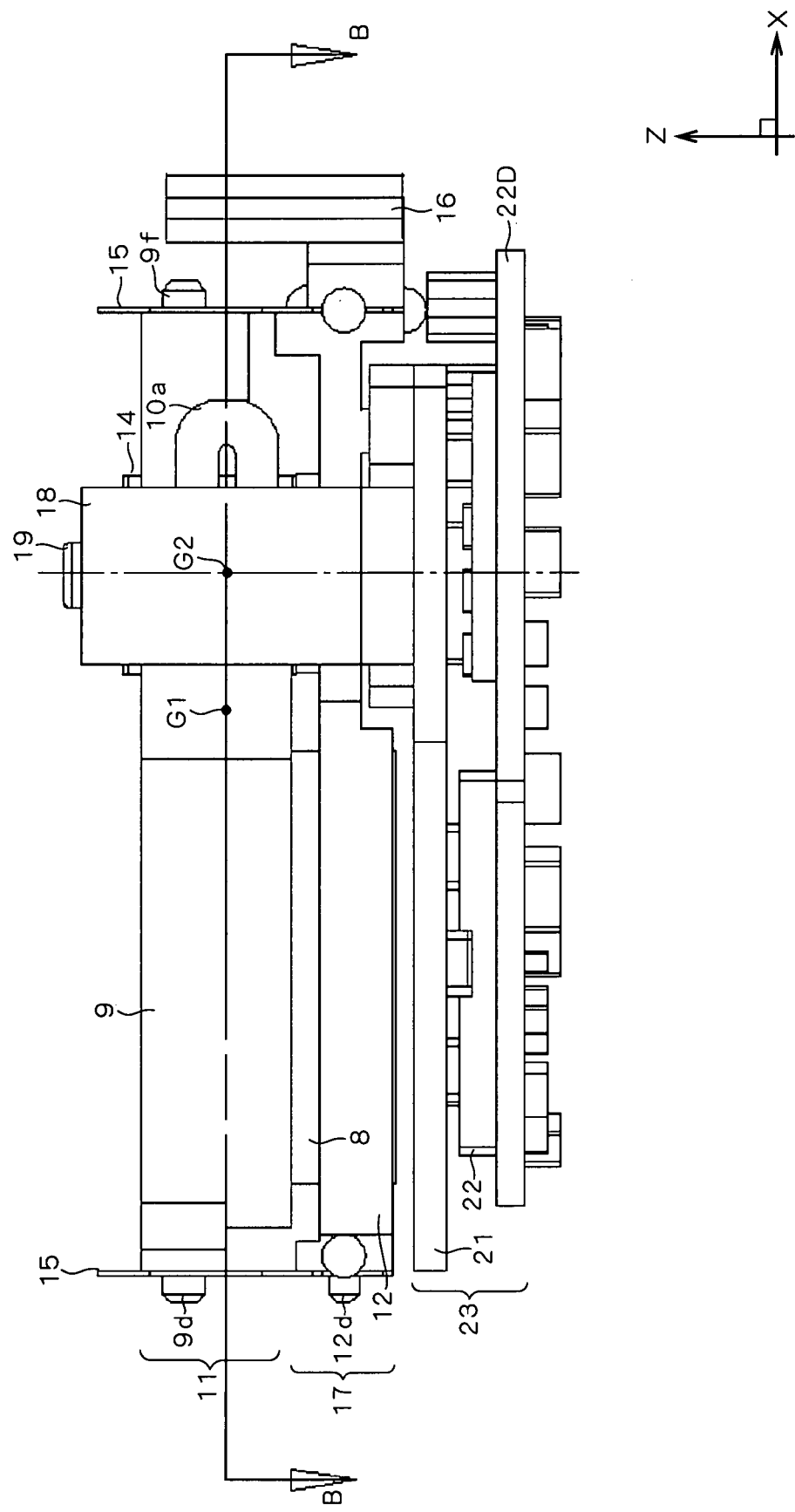
FIG. 4 is a side view of the image capturing apparatus according to the first embodiment of the present invention.

Next, the movable mechanism of each movable part will be described with reference to FIGS. 3 and 4 showing the respective movable parts as assembled. FIG. 3 is a top view of the image capturing apparatus according to the present embodiment, and FIG. 4 is a side view of the image capturing apparatus.

As shown in FIG. 4, the first movable part 11 is supported by the plate springs 15 with respect to the second movable part 17, and therefore supported to be movable translationally in the direction of the axis X. In addition, the present image capturing apparatus is designed such that the height of the center of gravity (first center of gravity) G1 of the first movable part 11 from the upper surface of the fixed base 21 substantially agrees with the height of the central position of the pair of coils 10*a* and 10*b* from the upper surface of the fixed base in the longitudinal direction Z (at the same height; the center of gravity G1 and the center of the first coils in the longitudinal direction are both positioned on the B-B line of FIG. 4).

Inserting the support shaft 19 of the fixed parts 23 into the cylindrical hole 12*b* of the second movable part 17, the movable parts (first movable part 11+second movable part 17) connected to each other by the plate springs 15 are supported to be slidable in the direction of the axis Z by being guided by the support shaft 19 with respect to the fixed part 23, and is also supported to be rotatable about the axis Z (in the direction of the axis Y). Further, the present image capturing apparatus is designed such that the height of the center of gravity (second center of gravity) G2 of the movable parts (first movable part 11+second movable part 17) substantially agrees with the center of the pair of coils 10*a* and 10 in the longitudinal direction as illustrated in FIG. 4 as the position on the line B-B intersecting the central axis of the support shaft 19 (both are, positioned at the same height when viewed from the upper surface of the fixed base 21) (also substantially agrees with the center of the focusing coil 14 in the longitudinal direction), and also substantially agrees with the central portion of the central axis of the support shaft 19 in the longitudinal direction.

Next, the defocusing correcting operation of the image capturing apparatus according to the present embodiment will be described with reference to FIG. 5. Here, FIG. 5 is a sectional view taken along the line A-A of FIG. 3.

Figure 5:
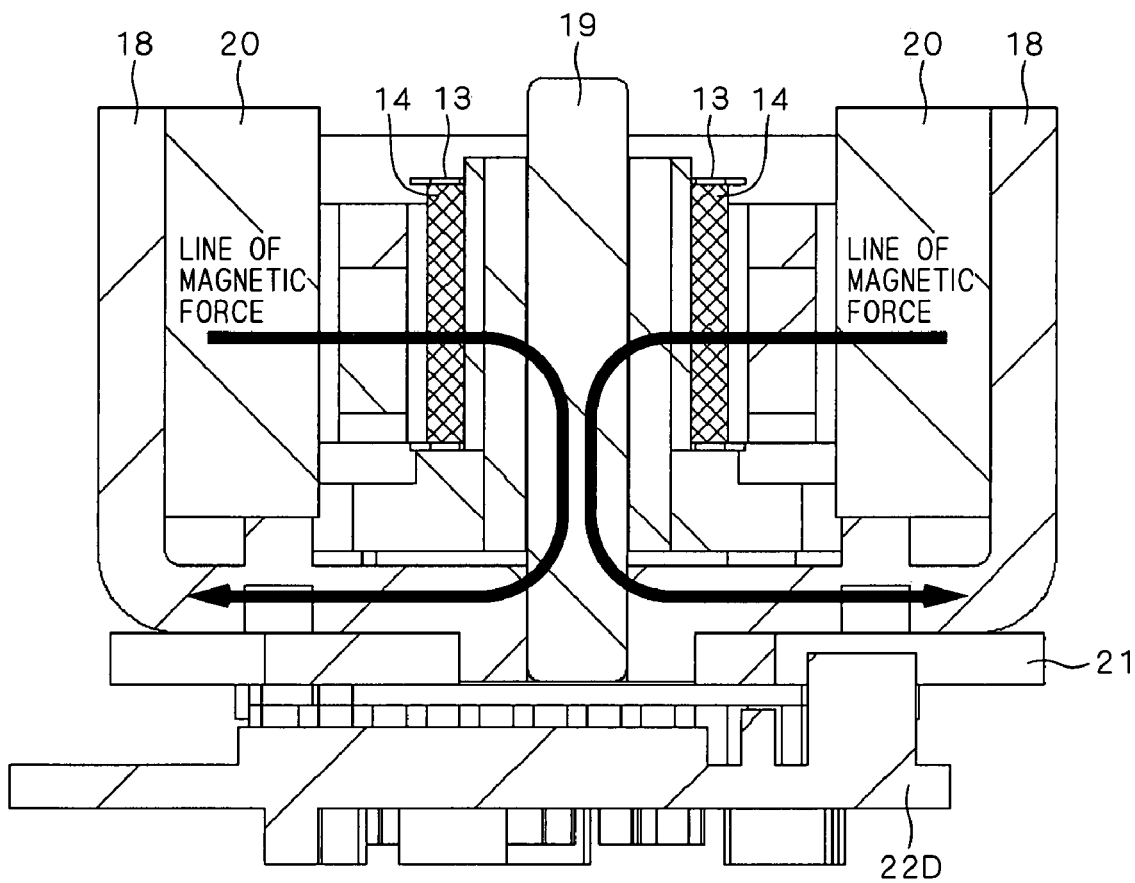
FIG. 5 is a sectional view taken along the line A-A of FIG. 3.
Figure 5:
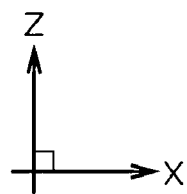

As shown in FIG. 5, active sides of the focusing coil 14 (crosshatched portions) are disposed in positions opposed to the magnets 20, respectively. The magnetic circuit has symmetric lines of magnetic force in the directions of U-shaped arrows with respect to the support shaft 19. Accordingly, feeding current from a power supply (not shown) to the focusing coil 14 causes current to flow from the farther side to the near side of the sheet of drawing on the left side of the magnetic circuit. An electromagnetic force in the direction Z+ is thereby generated on the active side of the focusing coil 14 under the Fleming's left-hand rule.

On the other hand, current flows from the near side to the farther side of the sheet of drawing on the right side of the magnetic circuit. An electromagnetic force in the direction Z+ is thereby generated on the active side of the focusing coil 14 under the Fleming's left-hand rule, and the movable parts (first movable part 11+second movable part 17) shift in the direction Z+ by being guided in the direction of the support shaft 19 of the fixed part 23 by this electromagnetic force. Further, herein, since the center of gravity G2 of the movable parts (first movable part 11+second movable part 17) substantially agrees with the center on the central axis of the support shaft 19 and the center of the focusing coil 14 in the longitudinal direction, the electromagnetic forces act upon the center of gravity G2, whereby the influence by friction is reduced, so that a smooth operation can be expected.

On the contrary, when setting the current to flow from the power supply to the focusing coil 14 in the reverse direction, current flows from the near side to the farther side of the sheet of drawing on the left side of the magnetic circuit, to cause an electromagnetic force in the direction Z− to be generated on the active side of the focusing coil 14 under the Fleming's left-hand rule, while current flows from the farther side to the near side of the sheet of drawing on the right side of the magnetic circuit, to cause an electromagnetic force in the direction Z− to be generated on the active side of the focusing coil 14 under the Fleming's left-hand rule. Therefore, the movable parts (first movable part 11+second movable part 17) shift in the direction Z− by being guided along the support shaft 19 of the fixed part 23 by this electromagnetic force. Further, herein, since the center of gravity G2 of the movable parts (first movable part 11+second movable part 17) substantially agrees with the aforementioned center of the support shaft 19 and the center of the focusing coil 14 in the longitudinal direction, as described above, the electromagnetic forces act upon the center of gravity G2, whereby the influence by friction is reduced, so that a smooth operation can be similarly expected.

Accordingly, switching the direction of feeding current from the power supply to the focusing coil 14 as described above on the basis of a signal indicative of defocusing can adjust the position of the movable parts (first movable part 11+second movable part 17) (or the position of the lens group 8), thereby correcting defocusing.

Next, an image blur correcting operation in the direction Y in the image capturing apparatus according to the present embodiment will be described with reference to FIG. 6. Here, FIG. 6 is a sectional view taken along the line B-B of FIG. 4.

Figure 6:
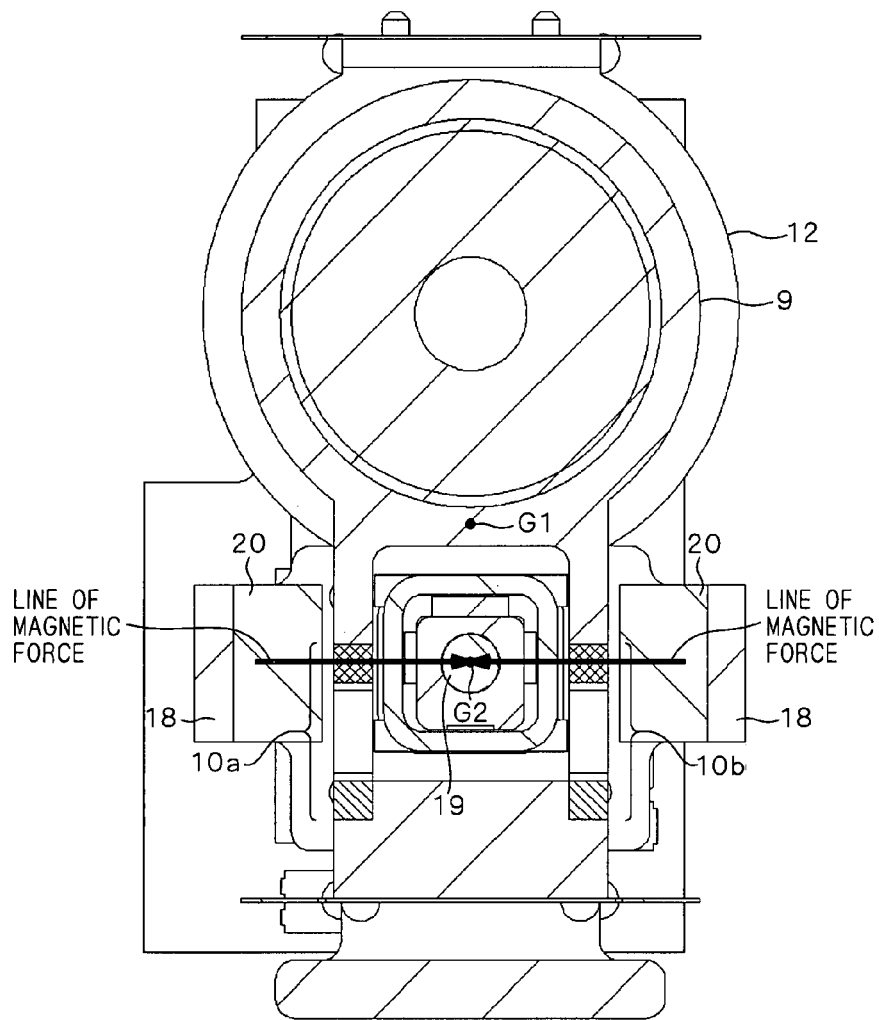
FIG. 6 is a sectional view taken along the line B-B of FIG. 4.
Figure 6:
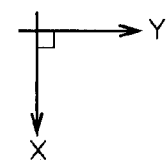

As shown in FIG. 6, the pair of coils 10a and 10b are each arranged such that its active side (crosshatched portions almost in parallel to the direction Z of the optical axis) is opposite or diametrically opposed to one of the magnets 20 corresponding to one of the first coils, and the magnetic circuit has symmetric lines of magnetic force in the directions of U-shaped arrows with respect to the support shaft 19. Here, feeding current from the power supply to the coil 10a in a clockwise direction about the axis Y causes current to flow from the near side to the farther side of the sheet of drawing on the left side of the magnetic circuit. An electromagnetic force in the direction X+ is thereby generated on the active side of the coil 10a under the Fleming's left-hand rule.

On the other hand, feeding current from the power supply to the coil 10b in a clockwise direction about the axis Y causes current to flow from the near side to the farther side of the sheet of drawing on the right side of the magnetic circuit. An electromagnetic force in the direction X− is thereby generated on the active side of the coil 10b under the Fleming's left-hand rule. Accordingly, the movable parts (first movable part 11+second movable part 17) rotate in a counterclockwise direction about the support shaft 19 by these electromagnetic forces. Further, this rotation can be considered almost equivalent to a shift in the direction Y− since the amount of rotation in carrying out this correction is minute (plus or minus 0.5 mm approximately). Furthermore, in this example, as already described, the electromagnetic forces act upon the same plane on which the center of gravity G2 is positioned since the height of the center of gravity G2 of the movable parts (first movable part 11+second movable part 17) from the upper surface of the fixed base 21 substantially agrees with the center of the respective coils 10a and 10 in the longitudinal direction, whereby the influence by friction is reduced, so that a smooth operation can be expected.

On the contrary, feeding current from the power supply to the coil 10a in the counterclockwise direction about the axis Y, current flows from the farther to near side of the sheet of drawing on the left side of the magnetic circuit, to cause an electromagnetic force in the direction X− to be generated on the active side of the coil 10a under the Fleming's left-hand rule.

On the other hand, applying current from the power supply to the coil 10b in the counterclockwise direction about the axis Y, current flows from the farther side to the near side of the sheet of drawing on the right side of the magnetic circuit, to cause an electromagnetic force in the direction X+ to be generated on the active side of the coil 10b under the Fleming's left-hand rule. Accordingly, the movable parts (first movable part 11+second movable part 17) rotate in the clockwise direction about the support shaft 19 by these electromagnetic forces. Further, this rotation can also be considered almost equivalent to a shift in the direction Y+ since the amount of rotation is minute (plus or minus 0.5 mm approximately), similarly to the above. Furthermore, in this example, as already described, the electromagnetic forces act upon the same plane on which the center of gravity G2 is positioned since the height of the center of gravity G2 of the movable parts (first movable part 11+second movable part 17) from the upper surface of the fixed base 21 substantially agrees with the center of the respective coils in the longitudinal direction, whereby the influence by friction is reduced, so that a smooth operation can be similarly expected.

Therefore, setting the directions of energizing the pair of coils 10a and 10b to be in the same phase (for example, when energizing the coil 10a in the clockwise direction about the axis Y, the coil 10b is also energized in the clockwise direction about the axis Y) as described above allows the position of the movable parts (first movable part 11+second movable part 17) to rotate about the support shaft 19 (shift in the direction Y).

Thus switching the direction of energizing the pair of coils 10a and 10b on the basis of a blur detection signal about the axis X allows adjustment of the position of movable parts (first movable part 11+second movable part 17) (the position of the lens group 8), thereby correcting shake in the direction Y.

Next, an image blur correcting operation in the direction X in the image capturing apparatus according to the present embodiment will be described with reference to FIG. 6.

As shown in FIG. 6, since the first coils 10a and 10b are arranged such that their active sides (crosshatched portions in FIG. 6) 10ae and 10be (FIG. 2) are opposite or diametrically opposed to the magnets 20, and the magnetic circuit has lines of magnetic force in the directions of arrows as shown in FIG. 6, feeding current from the power supply to the coil 10a in the clockwise direction about the axis Y causes current to flow from the near side to the farther side of the sheet of drawing on the left side of the magnetic circuit. An electromagnetic force in the direction X+ is thereby generated on the active side of the coil 10a under the Fleming's left-hand rule.

On the other hand, feeding current from the power supply to the coil 10b in the counterclockwise direction about the axis Y causes current to flow from the farther side to the near side of the sheet of drawing on the right side of the magnetic circuit. An electromagnetic force in the direction X+ is thereby generated on the active side of the coil 10b under the Fleming's left-hand rule.

On the contrary, feeding current from the power supply to the coil 10b in the counterclockwise direction about the axis Y, current flows from the farther side to the near side of the sheet of drawing on the left side of the magnetic circuit. An electromagnetic force in the direction X− is thereby generated on the active side of the coil 10a under the Fleming's left-hand rule.

On the other hand, feeding current from the power supply to the coil 10b in the clockwise direction about the axis Y, current flows from the near side to the farther side of the sheet of drawing on the right side of the magnetic circuit. An electromagnetic force in the direction X− is thereby generated on the active side of the coil 10b under the Fleming's left-hand rule.

Therefore, controlling the direction of energizing the pair of coils 10a and 10b to be in the opposite phase (for example, when energizing the coil 10a in the clockwise direction about the axis Y, the coil 10b is energized in the counterclockwise direction about the axis Y) as described above allows an electromagnetic force in the direction of the axis X to be generated.

On the other hand, as shown in FIG. 4, the first movable part 11 is connected to the second movable part 17 by the plate springs 15. These plate springs 15 have a shape that can allow only for deflection of the first movable part 11 in the longitudinal direction, so that the first movable part 11 can be shifted substantially in the direction of the axis X with respect to the second movable part 17. Therefore, the first movable part 11 can be shifted in the direction of the axis X by the electromagnetic forces in the direction of the axis X acting upon the active sides of the aforementioned first coils 10a and 10b.

Further, as already described, since the height of the center of gravity G1 of the first movable part 11 substantially agrees with the center of the first coils 10a and 10b in the longitudinal direction and the points to which the respective electromagnetic forces are applied are symmetric about the axis X with respect to the center of gravity G1, the first movable part 11 can translate smoothly in the direction X without being influenced by the moment around the center of gravity G1.

Thus switching the direction of energizing the pair of coils 10a and 10b on the basis of a blur detection signal about the axis Y allows adjustment of the position of the first movable part 11 (the position of the lens group 8), thereby correcting shake in the direction X.

Further, when the first movable part 11 shifts in the direction of the axis X in the state rotated about the support shaft 19, the first movable part 11 causes an inclination in accordance with the amount of rotation by being influenced by the direction of deflection of the plate springs 15, whereby an angle is formed with respect to the direction of the axis X. However, the influence is very small since the angle of rotation in this case is minute.

As described above, in the present embodiment, the first movable base 9 is fixed to the fixed part 23 with the second movable base 12 interposed therebetween, and the first movable base 9 is movable in the first direction X with respect to the second movable base 12, and the second movable base 12 is movable in the direction of the optical axis of the image forming lens 8 and rotatable in the second direction Y with respect to the support shaft 19 provided on the fixed part 23 in parallel to the optical axis, and particularly, the second movable base 12 is provided with the balancing weight 16 in a position substantially symmetric to the objective lens 8 with respect to the support shaft 19.

In such a manner, providing the balancing weight 16 on the second movable base 12 rotatably supported on the fixed part 23 and providing the first movable base 9 which translates with respect to the second movable base 12 achieves weight reduction of the first movable base 9, allowing the first movable base 9 to be driven with low driving force, which achieves reduction in consumption power.

Second Embodiment

Figure 7:
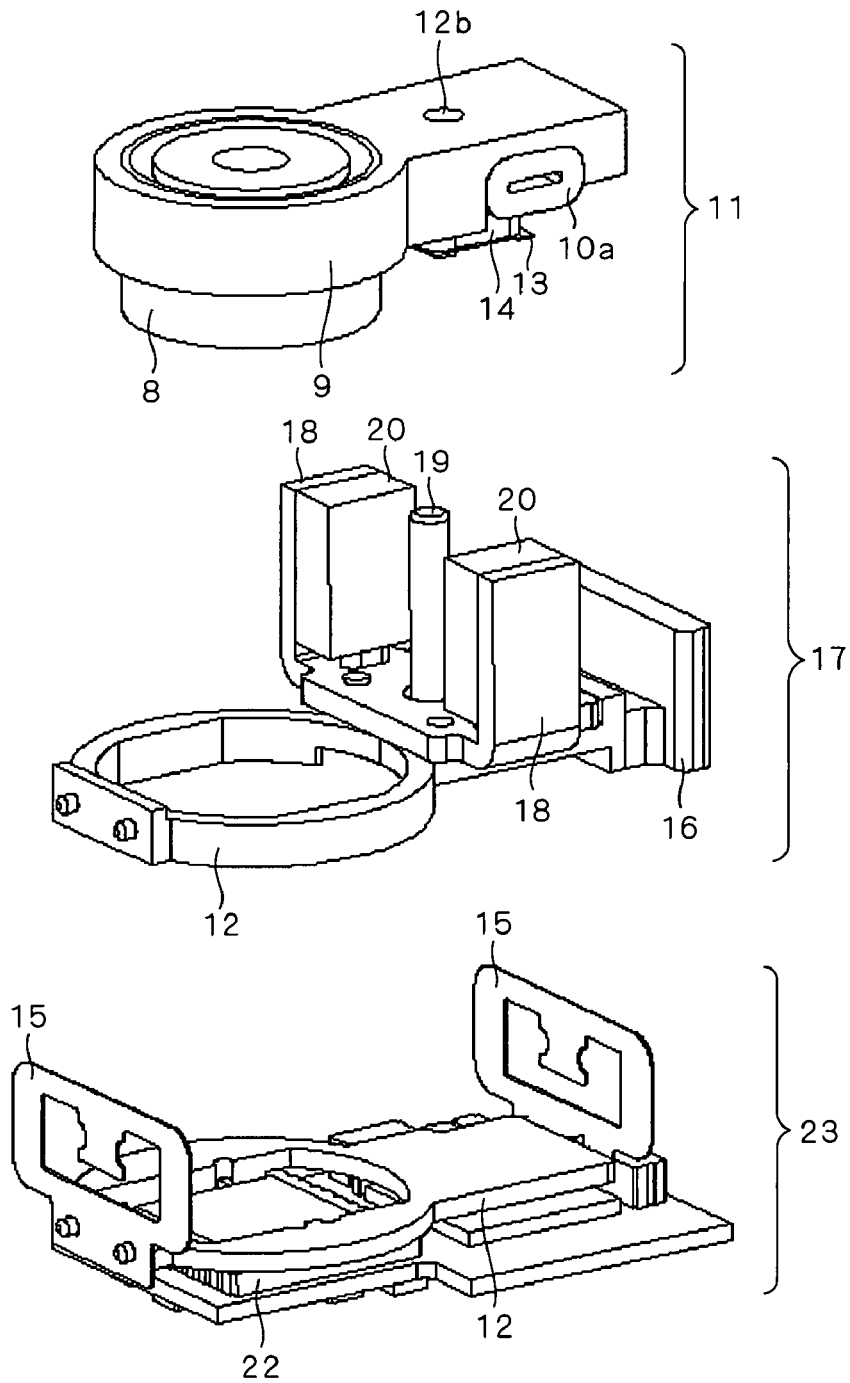
FIG. 7 is a disassembled perspective view showing the structure of a main part of an image capturing apparatus according to a second embodiment of the present invention.
Figure 7:
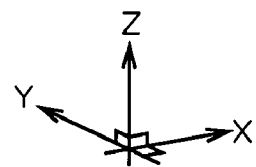

FIG. 7 is a disassembled perspective view showing the structure of a main part of an image capturing apparatus according to the present embodiment, and corresponds to FIG. 2. In FIG. 7, members equal to or corresponding to those of FIG. 2 are indicated by the same reference characters.

The difference of the structure of the image capturing apparatus according to the present embodiment from the first embodiment will now be described.

In the first embodiment, the yoke 18, support shaft 19 and pair of magnets 20 are disposed in the fixed part 23 (cf. FIG. 2); in the present embodiment, however, these components 18, 19 and 20 are all disposed in the second movable part 17. In the first embodiment, the plate springs 15 are used to connect and fix the first movable part 11 and second movable part 17; in the present embodiment, however, the plate springs 15 are used as members for connecting and fixing the fixed part 23 and second movable part 17 to each other. Further, in the first embodiment, the magnetic pieces 13 and focusing coil 14 are disposed in the second movable part 17; in the present embodiment, however, the magnetic pieces 13 and focusing coil 14 are disposed in the first movable part 11 as well as the pair of coils 10a and 10b.

In the present image capturing apparatus structured in the aforementioned manner, inserting the support shaft 19 of the second movable part 17 into the cylindrical hole 12b of the first movable part 11, the first movable part 11 is supported to be slidable in the direction of the axis Z with respect to the second movable part 17 by being guided along the support shaft 19, and is also supported to be rotatable about the axis Z. Therefore, the first movable part 11 can be shifted in the direction of the axis Z with respect to the second movable part 17 by the electromagnetic forces in the direction of the axis Z acting upon the active sides of the focusing coil 14, and can also be rotated about the support shaft 19 (shift in the direction of the axis Y) by the aforementioned generation of electromagnetic forces by the same-phase energization of the pair of coils 10a and 10b.

Since the plate springs 15 have a shape that can allow only for deflection of the second movable part 17 in the longitudinal direction, so that the second movable part 17 can be shifted substantially in the direction of the axis X with respect to the fixed part 23. Therefore, the movable parts (first movable part 11+second movable part 17) can be shifted in the direction of the axis X by the occurrence of electromagnetic forces by the opposite-phase energization of the pair of coils 10a and 10b.

The rotation of the first movable part 11 about the support shaft 19 is achieved with reference to the second movable part 17, and the shift in the direction of the axis X is achieved by the second movable part 17 with reference to the fixed part 23. Therefore, change in the direction of shift of the first movable part 11 depending on the direction of deflection of the plate springs 15 as encountered in the first embodiment does not occur in the present embodiment, so that a more stable three axis lens shifting mechanism can be provided.

As described above, according to the present embodiment, the shifts in three directions can be achieved independently by providing the second movable base 12 which translates with respect to the fixed part 23 and arranging the second movable base 12 to rotatably support the first movable base 9, so that three axis lens shifting mechanism having a more stable mechanism operation and an image capturing apparatus equipped with such mechanism can be provided.

Third Embodiment

Figure 8:
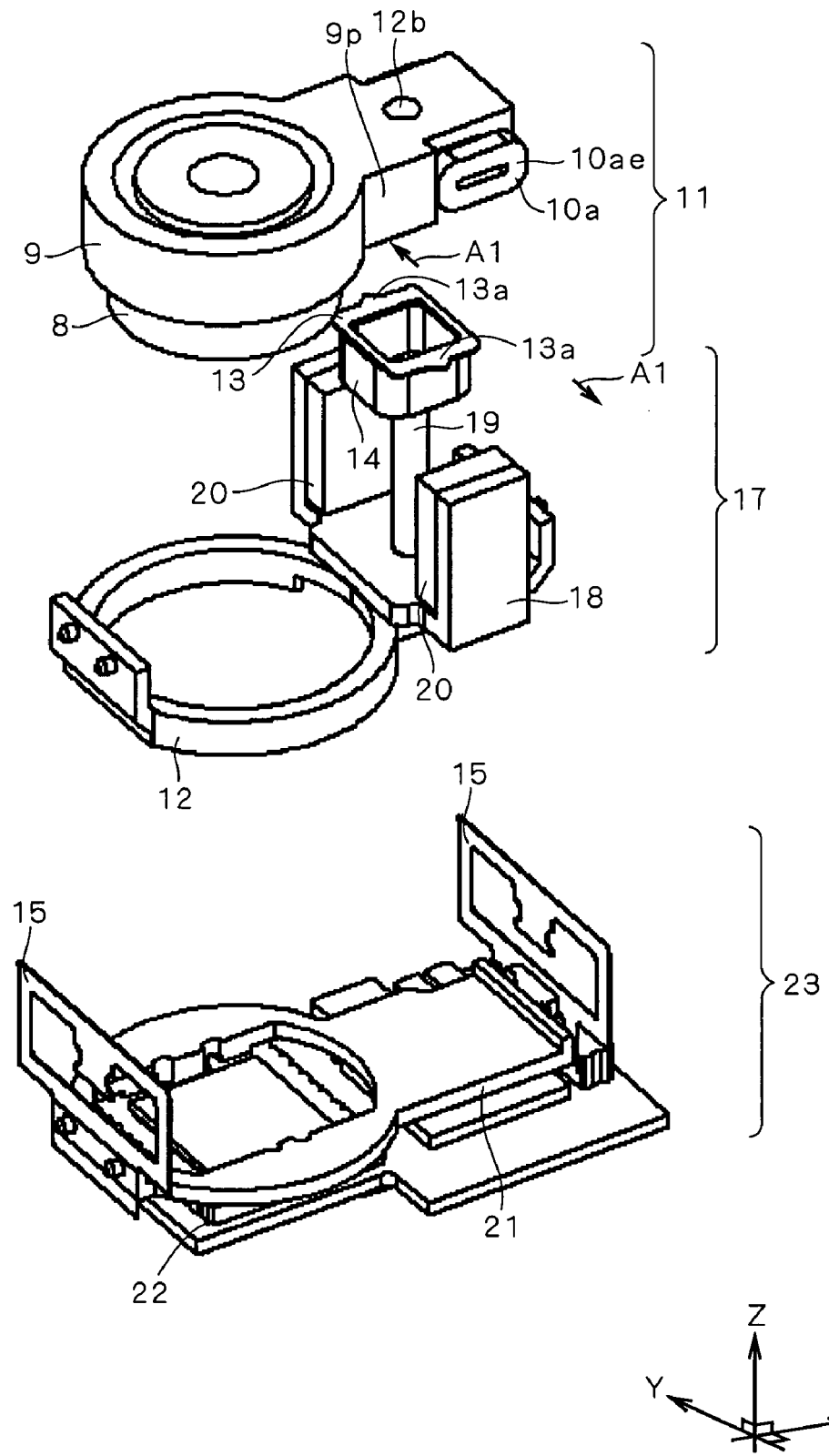
FIG. 8 is a disassembled perspective view showing the structure of a main part of an image capturing apparatus according to a third embodiment of the present invention.
Figure 9:
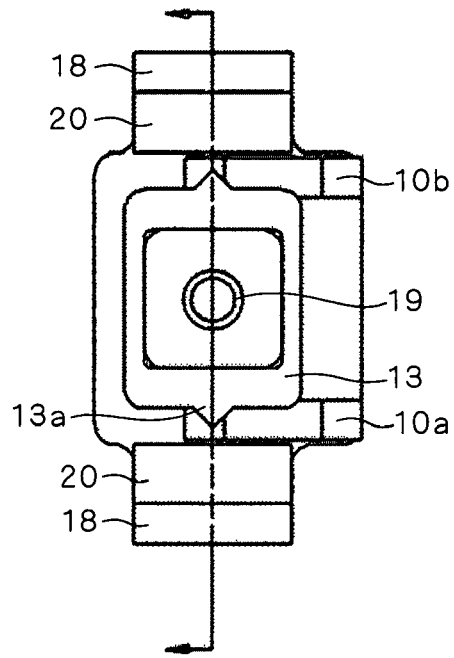
FIG. 9 is a top view showing the structure of the main part of the image capturing apparatus according to the third embodiment of the present invention.
Figure 10:
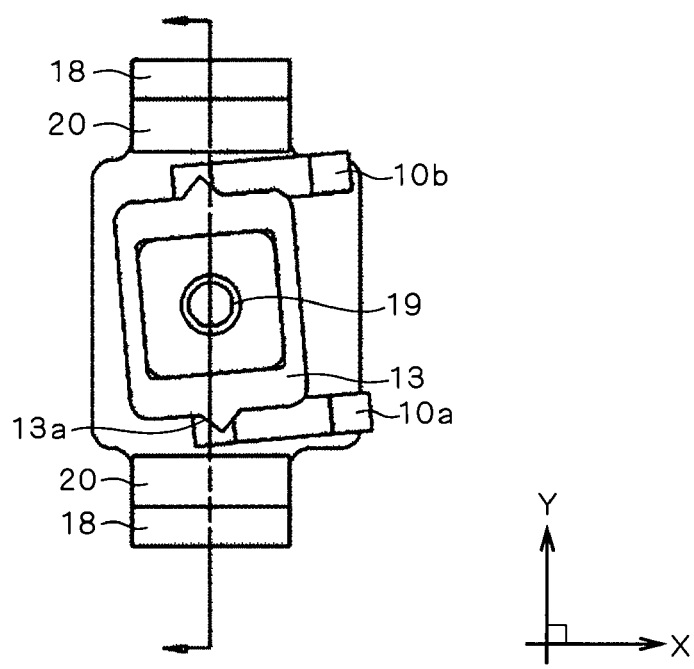
FIG. 10 is a top view showing the structure of the main part of the image capturing apparatus according to the third embodiment of the present invention.
Figure 11:
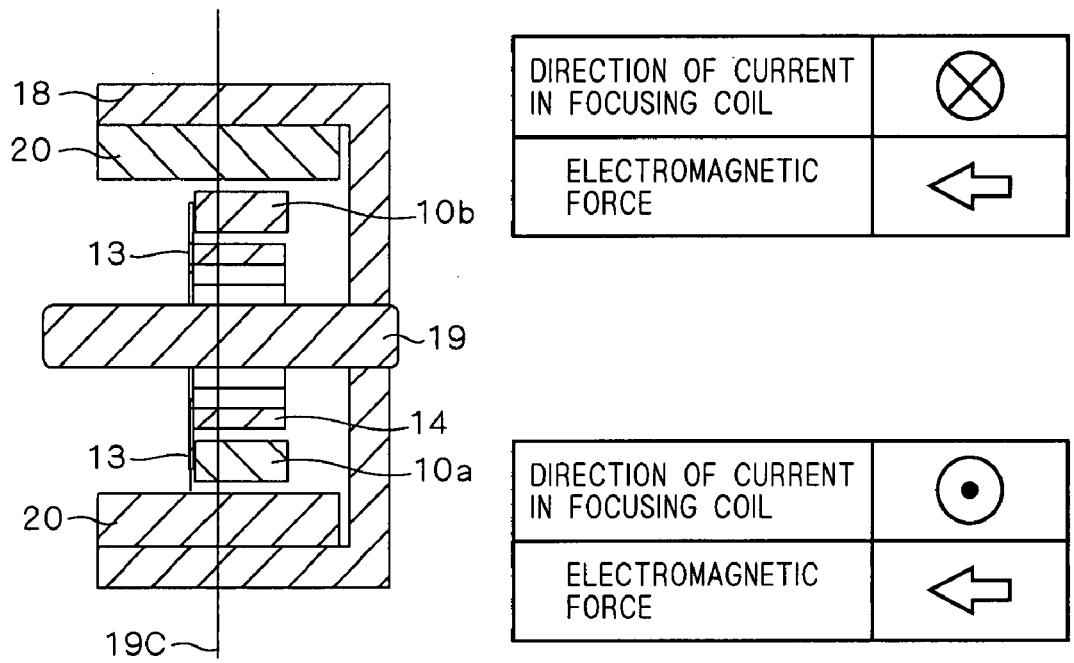
FIG. 11 is a side view showing the positional relationship between a magnetic piece and magnets in the image capturing apparatus according to the third embodiment of the present invention.
Figure 12:
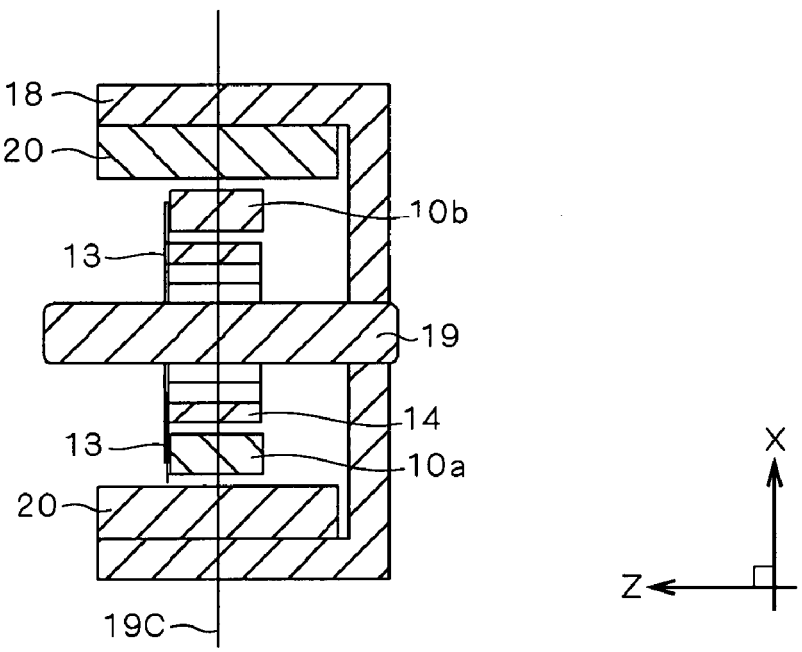
FIG. 12 is a side view showing the positional relationship between the magnetic piece and magnets in the image capturing apparatus according to the third embodiment of the present invention.

FIG. 8 is a disassembled perspective view showing the structure of a main part of an image capturing apparatus according to the present embodiment, and relates to an improvement of the structure shown in FIG. 7 described in the second embodiment. In FIG. 8, the focusing coil 14 and magnetic pieces 13 provided thereon are practically disposed to be encased within the projecting portion 9p of the first movable base 9 to constitute part of members of the first movable part 11. FIG. 9 is a top view showing the positional relationship between the magnetic pieces 13 and magnets 20 (or magnetic circuit formed by the yoke 18 and magnets 20) with no load (in the condition where no current flows through the pair of coils 10a and 10b for handshake correction), and one of the tables shown in FIG. 9 indicates the direction of electromagnetic force generated when flowing current to the active side 10be (cf. FIG. 2) of the coil 10b positioned above of the pair of coils 10a and 10b from the near side to the farther side of the sheet of drawing, and the other one of the tables indicates the direction of electromagnetic force generated when flowing current to the active side 10ae of the coil 10a positioned below from the top side to the farther side of the sheet of drawing. Further, FIG. 10 is a top view showing the positional relationship between the magnetic pieces 13 and magnets 20 when energizing the pair of coils 10a and 10b as indicated by the both tables of FIG. 9. FIG. 11 is a side view showing the positional relationship between the magnetic pieces 13 and magnets 20 with no load (in the condition where no current flows through the focusing coil 14), and further, FIG. 12 is a side view showing the positional relationship between the magnetic pieces 13 and magnets 20 when energizing the focusing coil 14 as indicated by the respective tables of FIG. 11. In each of FIGS. 9, 10, 11 and 12, the magnetic circuit (18+20), pair of coils 10a and 10b for handshake correction, focusing coil 14, support shaft 19 and magnetic pieces 13 are only shown for easy understanding of the positional relationship between the magnetic pieces 13 and magnets 20.

The difference of the structure of the image capturing apparatus according to the present embodiment from the second embodiment will now be described with reference to FIG. 8.

Comparison between FIGS. 7 and 8 shows that, in the second embodiment, the magnetic pieces 13 are made of thin, almost rectangular members each provided on the upper and lower surfaces of the focusing coil 14 (only the one provided on the lower surface of the focusing coil is illustrated in FIG. 7 since the assembled condition is shown), while in the present embodiment, a magnetic piece 13 is provided only on the upper surface of the focusing coil 14 and has almost-triangle projections 13a almost at the center of the sides diametrically opposed to the magnets 20, also as shown in FIG. 9.

A neutral position keeping operation in the direction Y (about the axis Z) of the image capturing apparatus according to the present embodiment will now be described with reference to FIGS. 9 and 10.

In FIG. 8, when the support shaft 19 of the second movable part 17 is inserted into the cylindrical hole 12b of the first movable part 11, forces are kept in balance in such a position as shown in FIG. 9 since the attractive force by the magnets 20 always exerts a force on the magnetic piece 13 in the directions of arrows A1 and the shift in the XY plane is limited to the rotation about the axis Z by the support shaft 19. At this time, each side of the magnetic piece 13 having the projections 13a is diametrically opposed to one of the magnets 20 corresponding to the side.

In the state shown in FIG. 9, applying current in combination as shown in the both tables of FIG. 9 to the pair of coils 10a and 10b, thrust in opposite phase to the support shaft 19 is generated under the Fleming's left-hand rule, causing the first movable part 11 to shift in the direction of rotation about the axis Z. The magnetic piece 13 mounted on the first movable part 11 is stopped at a position where the thrust and an attractive force that cancels out the torque around the support shaft 19 produced by this thrust are kept in balance, to be brought into the state shown in FIG. 10.

In the state shown in FIG. 10, when stopping applying current in combination as shown in the both tables of FIG. 9 to the pair of coils 10a and 10b, the influence of the thrust disappears, so that the magnetic piece 13 returns to the state shown in FIG. 9 where the forces are in balance. Accordingly, the first movable part 11 rotates about the axis Z and returns to the neutral position depending on presence or absence of application of current to the pair of coils 10a and 10b, and such control achieves a rotation position (Y direction) keeping mechanism.

Since the above-described neutral position keeping mechanism is defined by the distance between the magnetic piece 13 and magnets 20 in the structure shown in FIG. 9, its keeping force can be easily varied by devising the shape of the magnetic piece 13 and the like (in this case, the rate of change of distance between the magnetic piece 13 and magnets 20 by rotation).

An initial-energizing-force generating mechanism in the direction Z of the image capturing apparatus according to the present embodiment will now be described with reference to FIGS. 11 and 12.

In FIG. 8, when the support shaft 19 of the second movable part 17 is inserted into the cylindrical hole 12b of the first movable part 11, the relationship of the attractive force generated between the magnetic piece 13 and magnets 20 in the directions XY is as described above, while a force attracting toward the center of the magnets 20 in the longitudinal direction is always generated by an attractive force between the magnetic piece 13 and magnets 20 in the direction Z. On the other hand, since the magnetic piece 13 is provided in the first movable part 11, the first movable part 11 comes in contact with the second movable part 17 at the time of assembly before the magnetic piece 13 is positioned at the center 19C of the magnets 20 in the longitudinal direction, so that the first movable part 11 is limited in position, resulting in the positional relationship as shown in FIG. 11. In such positional relationship, an attractive force is generated on the magnetic piece 13 in accordance with the distance from the center 19C of the magnets 20 in the longitudinal direction, and therefore, a force pressing in the direction −Z is always exerted upon the first movable part 11 by the magnetic piece 13.

In the state shown in FIG. 11, applying current in combination as shown in tables of FIG. 11 to the focusing coil 14, thrust in the direction +Z is generated under the Fleming's left-hand rule, and when the thrust becomes equal to or greater than an initial energizing force, the first movable part 11 is shifted in the direction +Z. The magnetic piece 13 mounted on the first movable part 11 is stopped at a position where this thrust and the attractive force from the magnets 20 are kept in balance, to be brought into the state shown in FIG. 12.

In the state shown in FIG. 12, when stopping applying current to the focusing coil 14 in the direction shown in the tables of FIG. 11, the influence of the thrust disappears, so that the magnetic piece 13 returns to the position where the initial energizing force is generated, namely, the state shown in FIG. 11. Accordingly, the first movable part 11 is shifted in the direction of the axis Z or returns to the initial position depending on presence or absence of application of current to the focusing coil 14.

In the structure shown in FIG. 11, the above-described initial-energizing-force generating mechanism is defined by the distance between the magnetic piece 13 and the center 19C of the magnets 20 in the longitudinal direction, and therefore, its energizing force can easily be varied by relative arrangement.

As described above, the energizing force in the direction Z can be adjusted by the position of the magnetic piece 13 with respect to the center of the magnets 20 in the longitudinal direction and the neutral position keeping force in the direction Y can be adjusted by the shape of the projections 13a of the magnetic piece. Accordingly, one magnetic piece 13 has both the energizing function in the direction Z and the neutral position keeping function in the direction Y, and the respective functions can be adjusted independently. Therefore, energizing forces in two directions can be obtained with simple structure.

Fourth Embodiment

Figure 13:
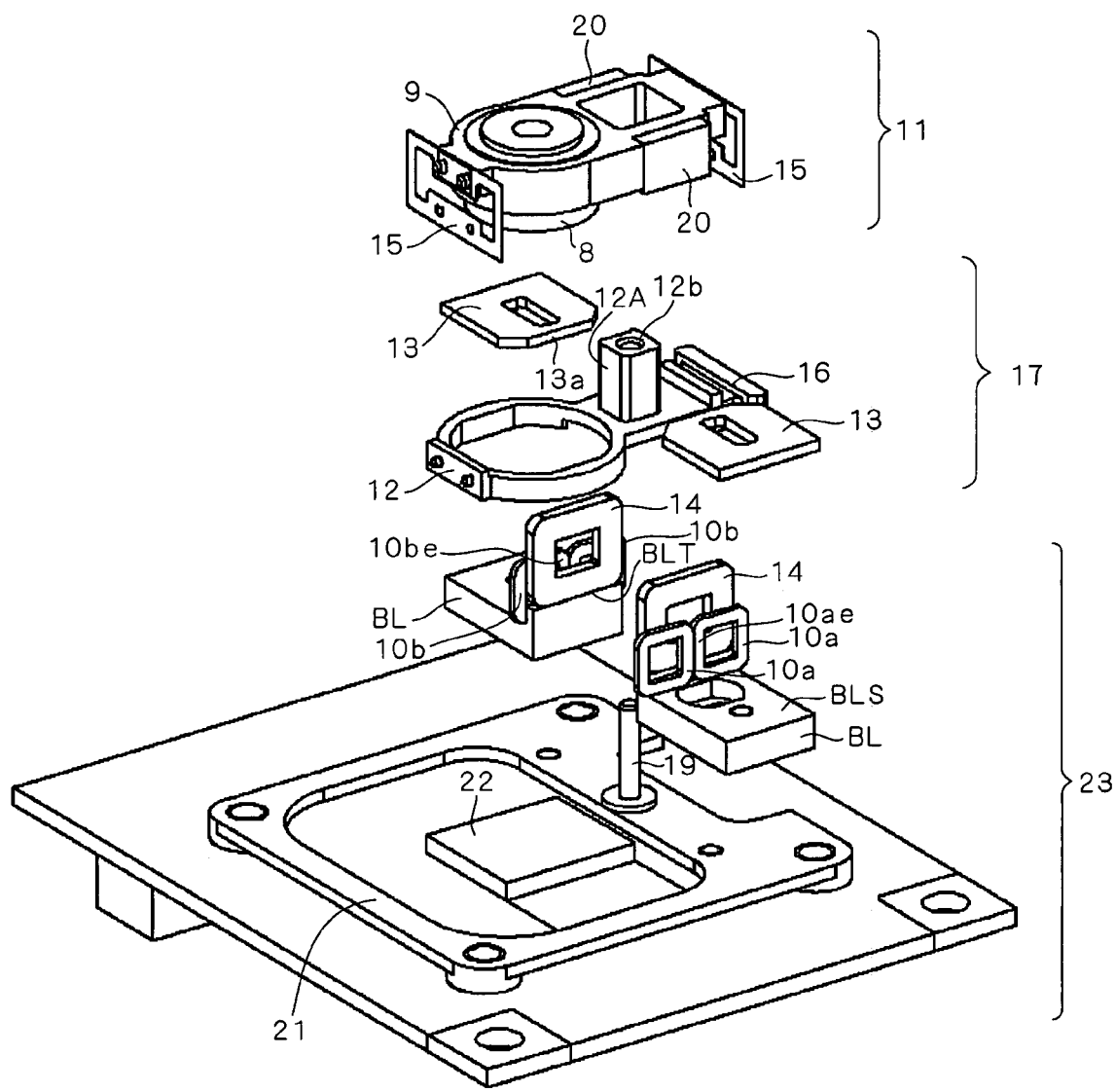
FIG. 13 is a disassembled perspective view showing the structure of a main part of an image capturing apparatus according to a fourth embodiment of the present invention.
Figure 13:
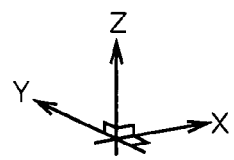

FIG. 13 is a disassembled perspective view showing the structure of a main part of an image capturing apparatus according to the present embodiment. Hereinafter, the difference between the structure of the image capturing apparatus according to the present embodiment and the structure of the image capturing apparatus according to the first embodiment will be described.

Comparison between FIGS. 13 and 2 shows that, in the first embodiment, the pair of coils 10a and 10b are provided in the first movable part 11 and the magnets 20 are provided in the fixed part 23, while in the present embodiment, the magnets 20 are provided in the first movable part 11 and the pair of coils 10a and 10b are provided in the fixed part 23.

Specifically, in FIG. 13, the respective bottom surfaces of two support holders BL having an L-shape in vertical cross section are secured to the fixed base 21 such that the support holders BL are opposed to each other with the support shaft 19 interposed therebetween. The focusing coil 14 is secured to the upper end (top) BLT of the L-shape of each of the support holders BL, and further, two each coils 10a and 10b for handshake correction are secured to the upper surface BLS of each of the support holders BL opposite to the bottom surface. When assembly is completed, each of the active sides 10ae and 10be of the pair of coils 10a and 10b is diametrically opposed to one of the magnets 20 corresponding to the coil. In FIG. 13, for ease of illustration, the magnetic pieces 13 are illustrated as disposed on the side of the second movable part 17, however, this illustration is not accurate, and actually, each of the magnetic pieces 13 is secured to the upper surface BLS of a corresponding one of the support holders BL. The through hole 12b is provided in a hollow cylindrical positioning member 12A for the support shaft 19.

Since the force acting upon the coils 10a and 10b in the magnetic field generated by the magnets 20 is used as the thrust of the present image capturing apparatus, the relation between produced forces does not change even when the coils 10a, 10b and the magnets 20 are changed in position with each other. Therefore, the similar effects can be obtained (in this case, since the coils 10a and 10b are fixed to the fixed part 23, the magnets 20 provided in the first movable part 11 are shifted in the direction X and rotated about the axis Z, to thereby achieve handshake correction; defocusing correction is also achieved similarly by the vertical shift of the magnets 20), and there is no need to energize the coils 10a and 10b provided in the first movable part 11 as shown in FIG. 2 in the first embodiment, so that an easy-to-assemble image capturing apparatus can be obtained. That is, in the image capturing apparatus shown in FIG. 13, the magnets 20 are merely provided in the first movable part 11, eliminating the need to install wiring for the coils 10a and 10b in the first movable part 11, which eliminates the need to take into account generation of an extra force resulting from such wiring. Further, the magnets 20 can easily be removed from the first movable part 11, so that the first movable part 11 is easy to disassemble (conversely, the first movable part 11 is easy to assemble).

In the third embodiment, the neutral keeping force in the direction Y and energizing force in the direction Z are achieved by the attractive force between the magnetic pieces 13 provided in the first movable part 11 and magnets 20 provided in the second movable part 17; in the present embodiment, however, the neutral keeping force in the direction Y and energizing force in the direction Z are achieved by the attractive force between the magnetic pieces 13 provided in the fixed part 23 and magnets 20 provided in the first movable part 11. In this case, the relation between produced forces does not change even when the magnetic pieces 13 and the magnets 20 are changed in position. Therefore, the similar effects (the neutral position keeping function in the direction Y and the energizing force generating function in the direction Z) as already described in the third embodiment can also be obtained in the present embodiment.

Fifth Embodiment

Figure 14:
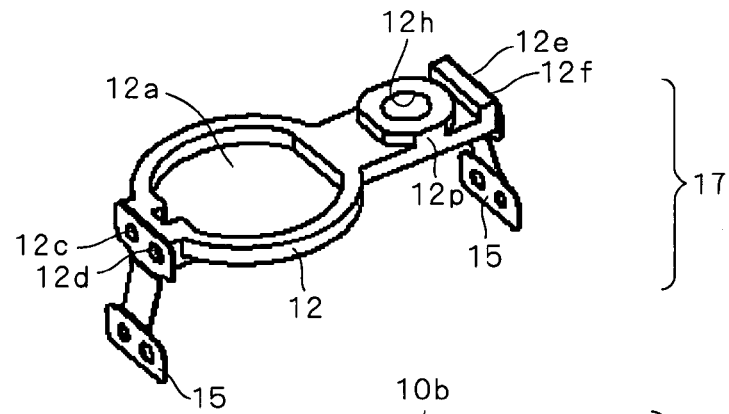
FIG. 14 is a disassembled perspective view showing the structure of a main part of an image capturing apparatus according to a fifth embodiment of the present invention.
Figure 14:
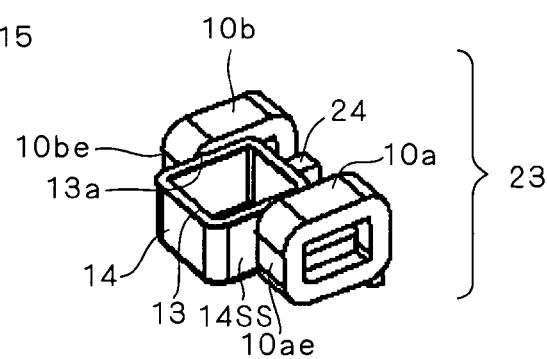
Figure 14:
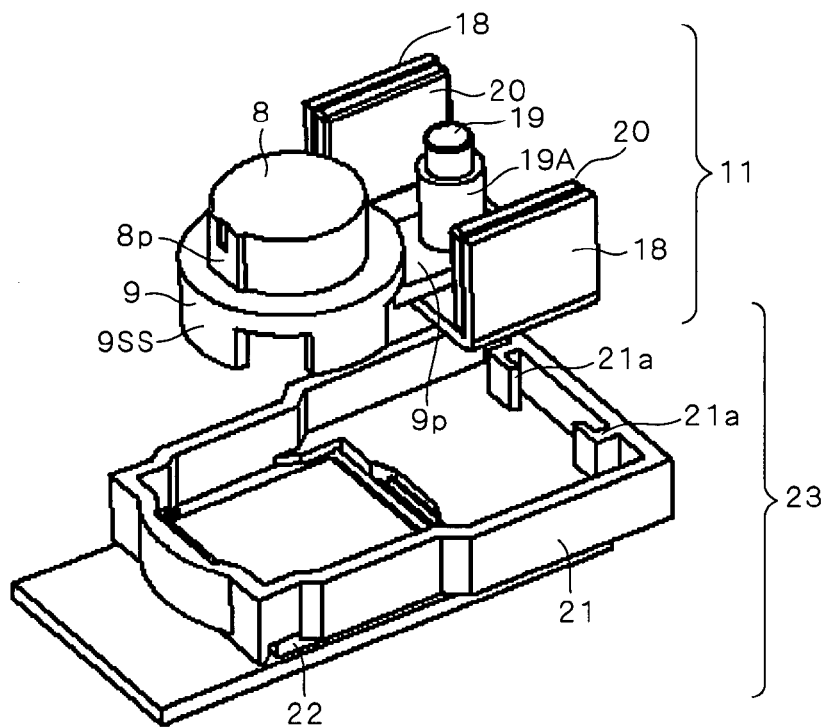
Figure 14:
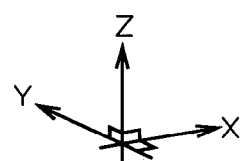

FIG. 14 is a disassembled perspective view showing the structure of a main part of an image capturing apparatus according to the present embodiment, and corresponds to FIG. 2. In FIG. 14, members equal to or corresponding to those of FIG. 2 are indicated by the same reference characters.

In FIG. 14, the lens group 8 is held by a substantially cylindrical portion of the first movable base 9, and the first movable base 9 has a shaft support member 19A extending substantially in parallel to the optical axis of the lens group 8. The shaft 19 is inserted in this shaft support member 19A, and the yoke 18 having a U-shape substantially symmetric relative to the XZ plane defined by the axis of the shaft 19 and optical axis is secured to the rear surface of the projecting portion 9p of the first movable base 9, and the pair of magnets 20 respectively being fixed to the U-shaped inner sides of the yoke 18 are further provided, so that a magnetic circuit (magnetic circuit forming a magnetic path to be applied to each of the active sides 10ae and 10be of the pair of coils 10a and 10b) made up of the yoke 18 and the pair of magnets 20 is formed in the first movable part 11. The lens group 8 has a projection 8p projecting about 0.1 mm, and this projection 8p is almost circular in transverse cross section. Herein, the diameter of the projection 8p is defined as "a small diameter" as compared to the diameter of a periphery 9SS of the first movable base 9, and the projection 8p will also be called a small diameter portion.

The second movable base 12 is assembled with the first movable base 9 by being inserted into the small diameter portion 8p of the first movable base 9 with a space that allows the first movable base 9 to be shifted in the direction Y. The second movable base 12 has the projection 12p having a substantially rectangular shape in transverse cross section formed unitarily with the first opening 12a and projecting in the first direction X. A through hole 12h is formed almost at the center of the projection 12p of the second movable base 12 into which the support shaft 19 to be described later is to be inserted, and the central position of this through hole 12h in transverse cross section and the central position of the first opening 12a in transverse cross section are aligned in the direction of the axis X. In addition, the plate springs 15 are bonded and fixed to the second movable base 12 at bosses 12c, 12d, 12e and 12f provided two each on the both sides of the second movable base 12 in the direction of the X axis, and the other ends of the plate springs 15 are bonded and fixed to the fixed base 21 at bosses provided two each not shown.

Looking at the fixed part 23, the pair of coils 10a and 10b are bonded and fixed to side surfaces 14SS of the focusing coil 14 to be diametrically opposed to each other. In addition, similarly to the third embodiment, one magnetic piece 13 having projections 13a at the center on its sides is secured to the upper end of the periphery 14SS of the focusing coil 14. Further, the focusing coil 14, and the pair of coils 10a and 10b are held by a coil holder 24 secured to another side surface of the focusing coil 14, and a projection of the coil holder 24 not shown is fit into a U-shaped slit portion 21a provided in the fixed base 21, so that the positioning and fixation relative to the fixed base 21 is achieved.

Figure 15:
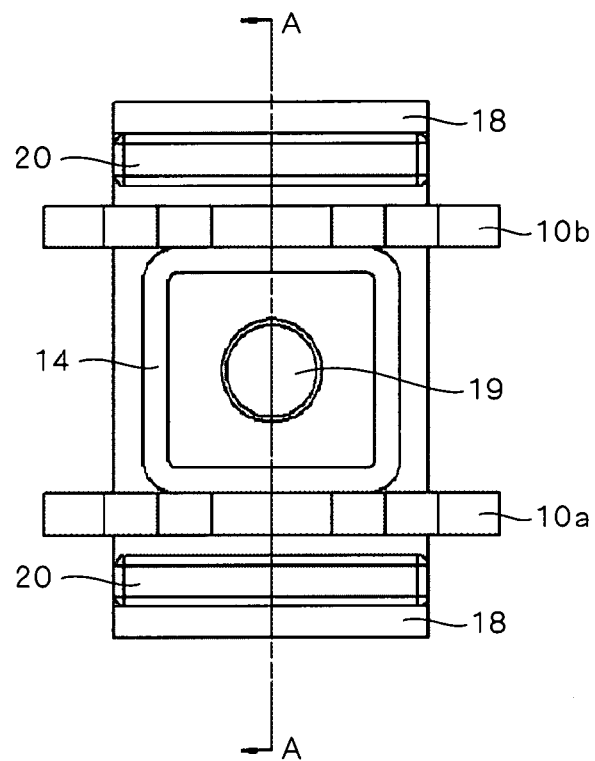
FIG. 15 is a top view showing the structure of the main part of the image capturing apparatus according to the fifth embodiment of the present invention.
Figure 16:
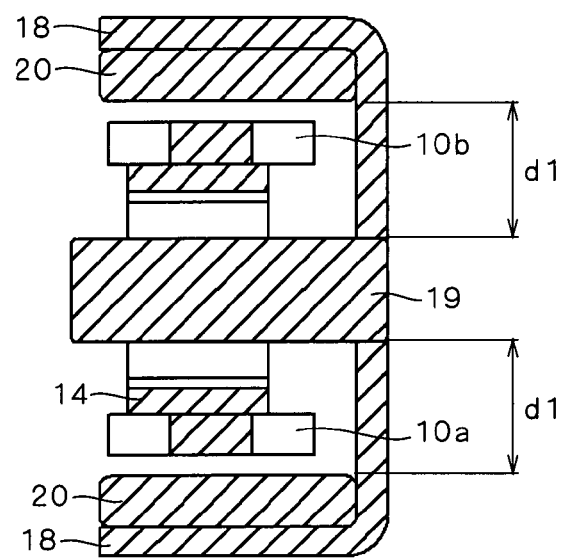
FIG. 16 is a vertical sectional view taken along the line A-A of FIG. 15.

The positional relationship between the coil holder 24 fixed to the fixed part 23 as described above or pair of coils 10a, 10b and the magnetic circuit (18+20) is as shown in the top view of FIG. 15 and FIG. 16 which is a vertical cross sectional view taken along the line A-A of FIG. 15. In this positional relationship, the central axis of the support shaft 19 and the central axis of the focusing coil 14 agree with each other, and the active sides 10ae and 10be of the pair of coils 10a and 10b are each disposed to be diametrically opposed to a corresponding one of the pair of magnets 20 opposed to the coil.

Particularly, in the fifth embodiment, the first movable part 11 is disposed in the fixed part 23 such that a required movable distance of the first movable part 11 is ensured with respect to the focusing coil 14 and pair of coils 10a and 10b bonded and fixed to its side surfaces. In the present embodiment, the focusing coil 14 and each of active sides of the pair of coils 10a and 10b are disposed in one magnetic gap provided between the support shaft 19 and each of the magnets 20, and further, considering the space that ensures a required movable distance of the first movable part 11 as a magnetic gap, the width of the magnetic gap is distance d1 shown in FIG. 16.

In this manner, in the driving mechanism according to the present embodiment in which the magnets 20 are disposed in the first movable part 11 and the pair of coils 10a and 10b in the fixed part 23, the magnets 20 are provided on the movable side, which causes the magnetic circuit to be also disposed on the movable side. Thus, a more efficient magnetic circuit can be formed, so that stronger thrust can be obtained.

The image capturing apparatus having such structure is assembled such that the first opening 12a of the second movable base 12 is inserted into the small diameter portion 8p of the first movable base 9 with a movable space, so that the amount of projection in the direction Y when the first movable part 11 is shifted in the direction Y is defined by the large diameter portion 9SS of the first movable base 9. This achieves a Y-direction shifting mechanism with compact structure.

Further, the magnets 20 are disposed on the side of the first movable part 11, and the magnetic piece 13 having the projections 13a is provided on the upper surface of the focusing coil 14 on the side of the fixed part 23, so that the neutral position keeping force in the direction Y and the energizing force in the direction Z already described in the third embodiment can be achieved.

Sixth Embodiment

Figure 17:
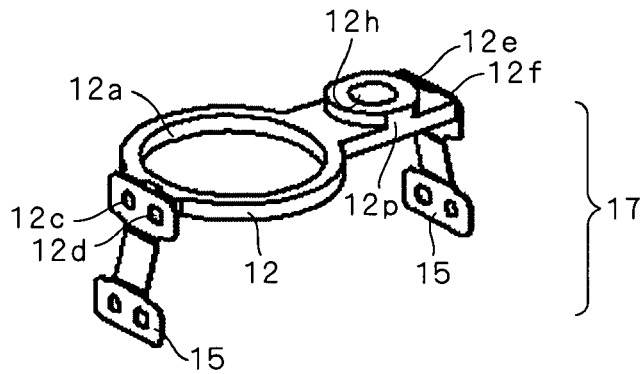
FIG. 17 is a disassembled perspective view showing the structure of a main part of an image capturing apparatus according to a sixth embodiment of the present invention.
Figure 17:
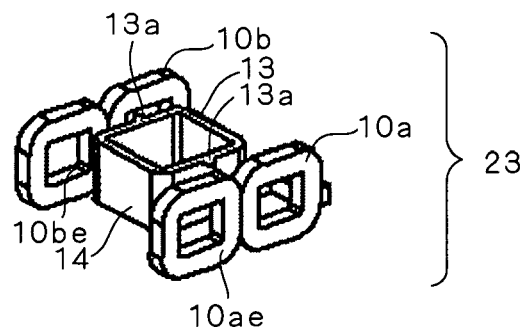
Figure 17:
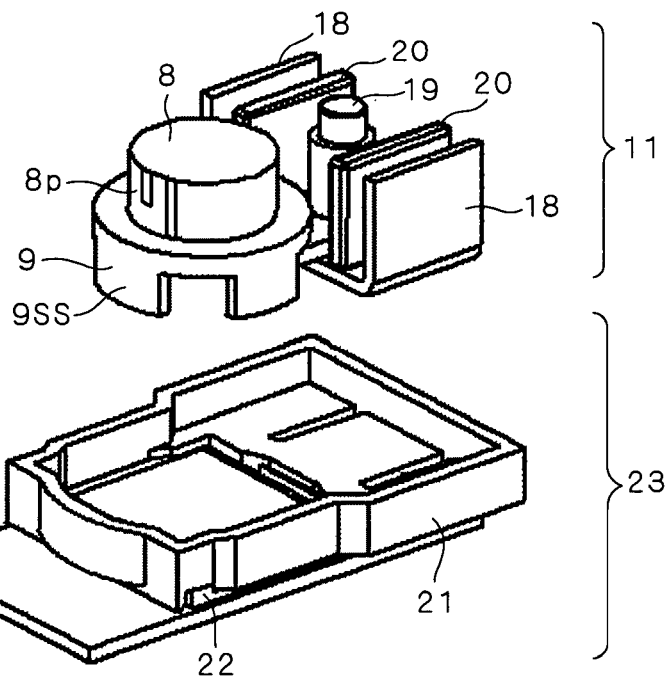
Figure 17:
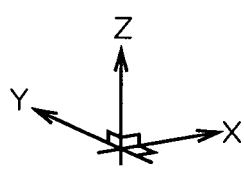

FIG. 17 is a disassembled perspective view showing the structure of a main part of an image capturing apparatus according to the present embodiment. In FIG. 17, members equal to or corresponding to those of FIG. 14 are indicated by the same reference characters. Herein, the difference in structure of the image capturing apparatus according to the present embodiment from the fifth preferred embodiment will be described with reference to, in addition to FIG. 17, FIG. 18 which is a plan view showing the positional relationship between the magnetic circuit and pair of coils 10a and 10b and FIG. 19 which is a vertical sectional view taken along the line A-A of FIG. 18.

Figure 18:
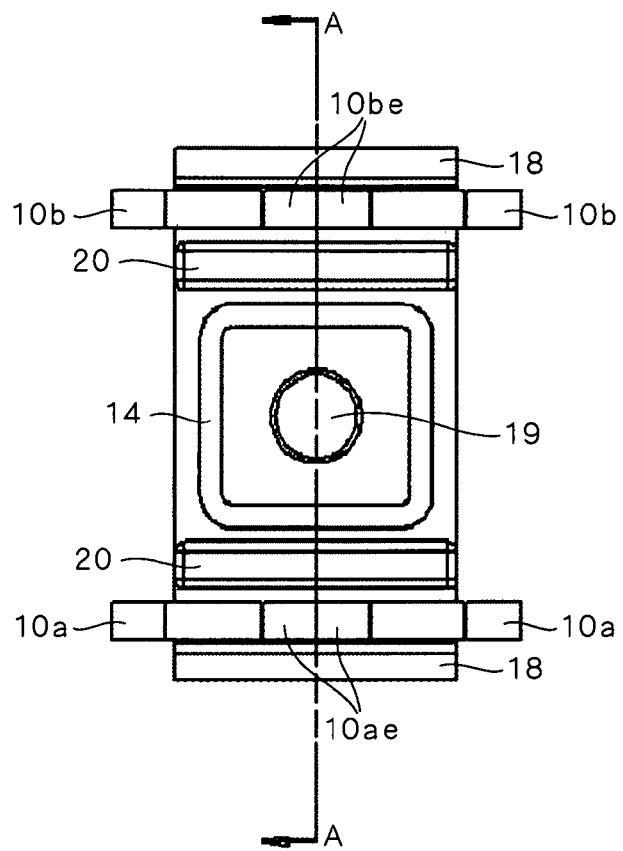
FIG. 18 is a top view showing the structure of the main part of the image capturing apparatus according to the sixth embodiment of the present invention.

In the present embodiment, the focusing coil 14 and pair of coils 10a and 10b are disposed such that the pair of magnets 20 in the first movable part 11 are each opposed to a corresponding one of the coils 10a and 10b and are disposed with a space that ensures a required movable distance of the first movable part 11. As illustrated in FIG. 18, each of the coils 10a and 10b is disposed in a space provided between a corresponding one of the magnets 20 and yoke 18, and the focusing coil 14 is disposed between the support shaft 19 and magnets 20 opposed to each other.

Figure 19:
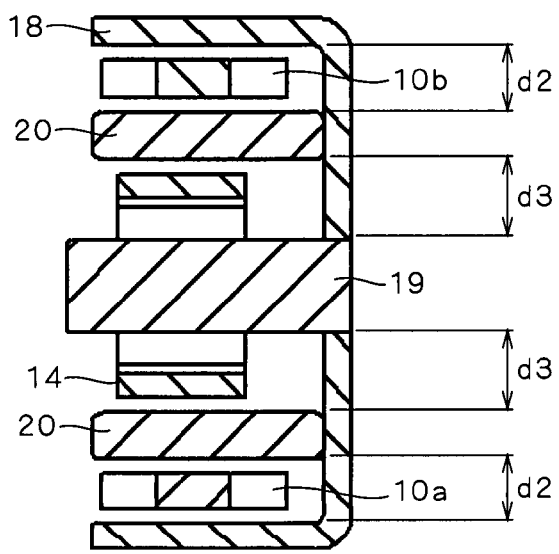
FIG. 19 is a vertical sectional view taken along the line A-A of FIG. 18.

In the present embodiment, considering that the focusing coil 14 and pair of coils 10a and 10b are disposed in different magnetic gaps and that a space that ensures a required movable distance of the first movable part 11 is provided, widths of the magnetic gaps divided into a plurality of sections shall be distances d2 and d3 as shown in FIG. 19.

Dividing the magnetic gap into a plurality of sections and setting each magnetic gap at a minimum required dimension as described in the present embodiment allows the magnetic flux from the magnets 20 to efficiently fly to the yoke 18 and support shaft 19, which allows an increase in thrust.

(Note)

While the invention has been shown and described in detail, the foregoing description is in all aspects illustrative and not restrictive. It is therefore understood that numerous modifications and variations can be devised without departing from the scope of the invention.

The invention claimed is:

1. An image capturing apparatus comprising:
    an imaging device including a light receiving surface and converting an optical image formed on said light receiving surface into an electric signal;
    an image forming lens guiding an image of a subject to said light receiving surface;
    a first movable base holding said image forming lens;
    a fixed part holding said imaging device and supporting said first movable base to be movable translationally in a first direction within a surface perpendicular to an optical axis of said image forming lens and to be rotatable about an axis in parallel to said optical axis and rotatable in a second direction substantially perpendicular to said first direction included in said perpendicular surface;

a pair of magnets provided on said fixed part in a position that does not prevent said image of said subject from being guided to said light receiving surface;

a pair of coils provided on said first movable base symmetrically relative to a surface defined by the direction of the optical axis of said image forming lens and said first direction, said pair of coils each including an active side substantially in parallel to the direction of said optical axis; and a power supply feeding current to each of said pair of coils, wherein said active side of each of said pair of coils is diametrically opposed to a corresponding one of said pair of magnets opposed to the coil, and a driving force in said first direction or said second direction is obtained by combination of directions of feeding current to said pair of coils.

2. The image capturing apparatus according to claim 1, further comprising:

a second movable base movable in the direction of said optical axis and rotatable in said second direction relative to a support shaft provided on said fixed part in parallel to said optical axis with respect to said fixed part, wherein said first movable base is movable in said first direction with respect to said second movable base.

3. The image capturing apparatus according to claim 2, wherein said second movable base is provided with a balancing weight in a position substantially symmetric to the position where said image forming lens is provided with respect to said support shaft.

4. An image capturing apparatus according to claim 1, comprising:

an imaging device including a light receiving surface and converting an optical image formed on said light receiving surface into an electric signal;

an image forming lens guiding an image of a subject to said light receiving surface;

a first movable base holding said image forming lens;

a fixed part holding said imaging device and supporting said first movable base to be movable translationally in a first direction within a surface perpendicular to an optical axis of said image forming lens and to be rotatable about an axis in parallel to said optical axis and rotatable in a second direction substantially perpendicular to said first direction included in said perpendicular surface;

a second movable base supported to be movable in said first direction with respect to said fixed part;

a pair of magnets provided on said second movable base in a position that does not prevent said image of said subject from being guided to said light receiving surface;

a pair of coils provided on said first movable base symmetrically relative to a surface defined by the direction of the optical axis of said image forming lens and said first direction, said pair of coils each including an active side substantially in parallel to the direction of said optical axis; and a power supply feeding current to each of said pair of coils, wherein said active side of each of said pair of coils is diametrically opposed to a corresponding one of said pair of magnets opposed to the coil, and a driving force in said first direction or said second direction is obtained by combination of directions of feeding current to said pair of coils, wherein said first movable base is movable in the direction of said optical axis of said image forming lens and rotatable in said second direction with respect to said second movable base.

5. The image capturing apparatus according to claim 4, wherein said second movable base is provided with a balancing weight in a position substantially symmetric to the position where said image forming lens is provided with respect to said support shaft.

6. The image capturing apparatus according to claim 4, wherein said first movable base is provided with one magnetic piece including a projection almost at the center of each of its two sides diametrically opposed to said pair of magnets, respectively, in a predetermined position in the longitudinal direction of said pair of magnets, and said magnetic piece includes both a neutral position keeping function in said second direction and an energizing force generating function in a third direction in parallel to said optical axis.

7. An image capturing apparatus comprising:

an imaging device including a light receiving surface and converting an optical image formed on said light receiving surface into an electric signal;

an image forming lens guiding an image of a subject to said light receiving surface;

a first movable base holding said image forming lens;

a fixed part holding said imaging device and supporting said first movable base to be movable translationally in a first direction within a surface perpendicular to an optical axis of said image forming lens and to be rotatable about an axis in parallel to said optical axis and rotatable in a second direction substantially perpendicular to said first direction included in said perpendicular surface;

a pair of coils provided on said fixed part in a position that does not prevent said image of said subject from being guided to said light receiving surface, said pair of coils each including an active side substantially in parallel to the direction of said optical axis;

a pair of magnets provided on said first movable base symmetrically relative to a surface defined by the direction of the optical axis of said image forming lens and said first direction; and a power supply feeding current to each of said pair of coils, wherein said active side of each of said pair of coils is diametrically opposed to a corresponding one of said pair of magnets opposed to the coil, and a driving force in said first direction or said second direction is obtained by combination of directions of feeding current to said pair of coils.

8. The image capturing apparatus according to claim 7, further comprising:

a second movable base movable in the direction of said optical axis and rotatable in said second direction relative to a support shaft provided on said fixed part in parallel to said optical axis with respect to said fixed part, wherein said first movable base is movable in said first direction with respect to said second movable base.

9. The image capturing apparatus according to claim 8, wherein said second movable base is provided with a balancing weight in a position substantially symmetric to the position where said image forming lens is provided with respect to said support shaft.

10. The image capturing apparatus according to claim 8, wherein
said fixed part is provided with a pair of magnetic pieces including a projection almost at the center of each of two sides diametrically opposed to said pair of magnets, respectively, in a predetermined position in the longitudinal direction of said pair of magnets, and
said pair of magnetic pieces include both a neutral position keeping function in said second direction and an energizing force generating function in a third direction in parallel to said optical axis.

11. The image capturing apparatus according to claim 7, further comprising:
a second movable base supported to be movable in said first direction with respect to said fixed part, wherein
said first movable base is movable in the direction of said optical axis and rotatable in said second direction with respect to said second movable base.

12. The image capturing apparatus according to claim 11, wherein
said fixed part is provided with one magnetic piece including a projection almost at the center of each of its two sides diametrically opposed to said pair of magnets, respectively, in a predetermined position in the longitudinal direction of said pair of magnets, and
said magnetic piece includes both a neutral position keeping function in said second direction and an energizing force generating function in a third direction in parallel to said optical axis.

13. The image capturing apparatus according to claim 11, wherein
said first movable part is provided with a U-shaped yoke in a position that does not prevent said image forming lens from being held, and
each of said pair of magnets is attached to a position opposed to a portion of said yoke diametrically opposed to a corresponding one of said pair of magnets, said pair of magnets forming a magnetic circuit together with said yoke, said magnetic circuit forming a magnetic path to be acted upon said active side of each of said pair of coils.

14. The image capturing apparatus according to claim 13, wherein
a magnetic gap is provided between each of said pair of magnets and said diametrically opposed portion of said yoke diametrically opposed to the magnet, and
said active side of a corresponding one of said pair of coils is disposed in each magnetic gap.

15. The image capturing apparatus according to claim 11, wherein
said second movable base is arranged in a small diameter portion of said image forming lens provided on said first movable base.

* * * * *